United States Patent
Mitani et al.

(10) Patent No.: US 10,893,221 B2
(45) Date of Patent: Jan. 12, 2021

(54) IMAGING SENSOR WITH WAVELENGTH DETECTION REGIONS AND PRE-DETERMINED POLARIZATION DIRECTIONS

(71) Applicant: Sony Corporation, Tokyo (JP)

(72) Inventors: Hitoshi Mitani, Kanagawa (JP); Masafumi Wakazono, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/301,987

(22) PCT Filed: Aug. 3, 2017

(86) PCT No.: PCT/JP2017/028290
§ 371 (c)(1),
(2) Date: Nov. 15, 2018

(87) PCT Pub. No.: WO2018/034167
PCT Pub. Date: Feb. 22, 2018

(65) Prior Publication Data
US 2019/0174077 A1  Jun. 6, 2019

(30) Foreign Application Priority Data

Aug. 17, 2016  (JP) .................................. 2016-159854

(51) Int. Cl.
*G01N 33/00* (2006.01)
*A01G 7/00* (2006.01)
(Continued)

(52) U.S. Cl.
CPC ........... *H04N 5/332* (2013.01); *G06T 3/4038* (2013.01); *H04N 5/23238* (2013.01);
(Continued)

(58) Field of Classification Search
CPC .. H04N 5/2254; H04N 5/23238; H04N 5/349; H04N 13/257; H04N 13/324;
(Continued)

(56) References Cited

U.S. PATENT DOCUMENTS 9,686,487 B1 *   6/2017  Fish ...................... H04N 5/3535
9,876,972 B1 *   1/2018  Powell ............... H04N 5/37213
(Continued)

FOREIGN PATENT DOCUMENTS

JP          4932978 B1      2/2012
JP        2017-228988 A    12/2017
(Continued)

OTHER PUBLICATIONS

Japanese Office Action dated Jan. 30, 2020 for corresponding Japanese Application No. 2016-159854.

*Primary Examiner* — Alison Slater
(74) *Attorney, Agent, or Firm* — Michael Best & Friedrich LLP

(57) ABSTRACT

The present disclosure includes an imaging sensor, an imaging method, and a non-transitory computer-readable medium. The imaging sensor includes a plurality of wavelength detection regions. The plurality of wavelength detection regions including at least a first wavelength detection region. The first wavelength detection region comprises a plurality of pixels configured to detect light within a first pre-determined wavelength range, and detect the light at different pre-determined polarization directions.

20 Claims, 18 Drawing Sheets

(51) Int. Cl.
*G01N 21/25* (2006.01)
*G01N 21/27* (2006.01)
*G01N 21/3563* (2014.01)
*H04N 5/33* (2006.01)
*H04N 9/04* (2006.01)
*H04N 5/232* (2006.01)
*G06T 3/40* (2006.01)
*G02B 5/30* (2006.01)
*H04N 5/225* (2006.01)
*G01N 21/31* (2006.01)
*G01N 21/21* (2006.01)

(52) U.S. Cl.
CPC .............. *H04N 9/045* (2013.01); *G01N 21/21* (2013.01); *G01N 21/255* (2013.01); *G01N 2021/3148* (2013.01); *G02B 5/3025* (2013.01); *G06T 2207/10036* (2013.01); *G06T 2207/30188* (2013.01); *H04N 2005/2255* (2013.01)

(58) Field of Classification Search
CPC .. H04N 13/334; H04N 13/337; H04N 13/341; H04N 13/398; H04N 9/04551; H04N 9/083; H04N 27/14621; H04N 5/332; H04N 9/045; H04N 2005/2255; H04N 5/3696; H04N 5/378; H04N 13/218; G02B 26/00; G02B 27/286; G02B 5/201; G02B 5/3025; G02B 3/0006; G02B 5/20; G06T 2207/30188; G06T 3/4038; G06T 2207/10024; G06T 2207/20021; G06T 2207/20221; G06T 2207/10038; G01N 21/21; G01N 21/255; G01N 2021/8466; G01N 21/27; H01L 27/14621; H01L 27/14625; H01L 27/14; H01L 27/14607; H01L 27/14645; G01J 3/0224; G01J 3/2803; G01J 4/04; G01J 2003/2806

See application file for complete search history.

(56) References Cited

U.S. PATENT DOCUMENTS

| | | | |
|---|---|---|---|
| 10,051,209 B2* | 8/2018 | Benmokhtar Benabdellah | G02B 27/1026 |
| 10,362,280 B2* | 7/2019 | Kondo | H04N 9/04 |
| 10,460,422 B2* | 10/2019 | Kurita | B60R 11/02 |
| 2009/0290039 A1* | 11/2009 | Kanamori | H04N 9/045 348/222.1 |
| 2010/0046853 A1* | 2/2010 | Goodnough | H04N 5/37206 382/275 |
| 2010/0282945 A1* | 11/2010 | Yokogawa | H04N 5/335 250/208.1 |
| 2012/0075513 A1* | 3/2012 | Chipman | G01J 4/04 348/302 |
| 2012/0169910 A1* | 7/2012 | Singh | G02B 27/286 348/302 |
| 2013/0270421 A1* | 10/2013 | Kanamori | G02B 23/24 250/208.1 |
| 2015/0029321 A1* | 1/2015 | Imamura | G01N 21/59 348/77 |
| 2015/0212294 A1* | 7/2015 | Imamura | H04N 5/23212 348/345 |
| 2015/0215593 A1* | 7/2015 | Sambongi | G01C 3/08 348/336 |
| 2016/0006954 A1* | 1/2016 | Robertson | H04N 5/332 348/144 |
| 2016/0063420 A1* | 3/2016 | Tomii | G06Q 10/06314 705/7.24 |
| 2018/0136116 A1* | 5/2018 | Takashima | A01G 7/00 |
| 2019/0006407 A1* | 1/2019 | Uesaka | H01L 27/14 |
| 2019/0188827 A1* | 6/2019 | Mitani | H04N 5/23229 |

FOREIGN PATENT DOCUMENTS

| | | |
|---|---|---|
| WO | 2008/149489 A1 | 12/2008 |
| WO | 2015/015722 A1 | 2/2015 |

\* cited by examiner

| | | | | | | | | |
|---|---|---|---|---|---|---|---|---|
| 0 | 45 | 0 | 45 | 0 | 45 | 0 | 45 | ⎫ |
| 135 | 90 | 135 | 90 | 135 | 90 | 135 | 90 | ⎬ IR |
| 0 | 45 | 0 | 45 | 0 | 45 | 0 | 45 | |
| 135 | 90 | 135 | 90 | 135 | 90 | 135 | 90 | ⎭ |
| 0 | 45 | 0 | 45 | 0 | 45 | 0 | 45 | ⎫ |
| 135 | 90 | 135 | 90 | 135 | 90 | 135 | 90 | ⎬ B |
| 0 | 45 | 0 | 45 | 0 | 45 | 0 | 45 | |
| 135 | 90 | 135 | 90 | 135 | 90 | 135 | 90 | ⎭ |
| 0 | 45 | 0 | 45 | 0 | 45 | 0 | 45 | ⎫ |
| 135 | 90 | 135 | 90 | 135 | 90 | 135 | 90 | ⎬ G |
| 0 | 45 | 0 | 45 | 0 | 45 | 0 | 45 | |
| 135 | 90 | 135 | 90 | 135 | 90 | 135 | 90 | ⎭ |
| 0 | 45 | 0 | 45 | 0 | 45 | 0 | 45 | ⎫ |
| 135 | 90 | 135 | 90 | 135 | 90 | 135 | 90 | ⎬ R |
| 0 | 45 | 0 | 45 | 0 | 45 | 0 | 45 | |
| 135 | 90 | 135 | 90 | 135 | 90 | 135 | 90 | ⎭ |
| | | | | | | | | ⎫ |
| | | | | | | | | ⎬ NON-POLARIZATION/WHITE |
| | | | | | | | | |
| | | | | | | | | ⎭ |

IMAGING SENSOR WITH WAVELENGTH DETECTION REGIONS AND PRE-DETERMINED POLARIZATION DIRECTIONS

CROSS REFERENCE TO RELATED APPLICATIONS

This application claims the benefit of Japanese Priority Patent Application JP 2016-159854 filed on Aug. 17, 2016, the entire contents of which are incorporated herein by reference.

TECHNICAL FIELD

The present disclosure relates to an examination device, an examination method, and a program. In particular, the present disclosure relates to an examination device, an examination method, and a program configured to favorably perform desired examination.

BACKGROUND ART

Typically, a normalized difference vegetation index (NDVI) has been utilized as an index for distribution status and activity of plant.

For example, in applications in the area of remote sensing and precision agriculture, a growing status of crops is examined using an image acquired in such a manner that an examination target is imaged by spectroscopy for a near-infrared light component and a red light component. Alternatively, a polarization imager configured such that various polarization filter are arranged for pixels is utilized so that an image having characteristics according to a polarization direction can be acquired. Note that the polarization imager is configured such that the pixels on a light receiving surface are divided according to multiple polarization directions, and generates an image for each polarization direction. Thus, a resolution is decreased (e.g., the resolution is decreased to ¼ when four polarization directions are used).

For example, Patent Literature 1 discloses an imaging device configured such that a polarizer array including polarizers (a polarization filter for each pixel) arranged in an array is shifted in units of pixel by an actuator to acquire multiple images and a resolution is held by processing of these images.

CITATION LIST

Patent Literature

[PTL 1]
Japanese Patent No. 4932978

SUMMARY

Technical Problem

A technique (referred to as "image stitching") of acquiring an image with a high resolution across a wide area by stitching of multiple images continuously acquired during movement has been typically known. However, it is difficult to realize both of the technique of acquiring the wide image by stitching of multiple images and the technique of using the imaging device disclosed in Patent Literature 1 to maintain the resolution. For this reason, it has been demanded for, e.g., favorable examination of vegetation by means of the normalized difference vegetation index that a wide image is acquired for a high resolution even when the polarization imager is used.

The present disclosure has been made in view of the above-described situation, and is intended to favorably perform desired examination.

Solution to Problem

An examination device according to one aspect of the present disclosure includes: for each of wavelength ranges, a plurality of detection regions, each including a plurality of sensor elements arranged in a matrix and configured to detect light with an identical wavelength range, in which the plurality of sensor elements are arranged such that adjacent ones of the sensor elements detect light in different polarization directions and are arranged as a set including sensor elements corresponding to the number of polarization directions.

In an examination device configured to include, for each of wavelength ranges, a plurality of detection regions, each having a plurality of sensor elements arranged in a matrix and configured to detect light with an identical wavelength range and configured such that the plurality of sensor elements are arranged such that adjacent ones of the sensor elements detect light in different polarization directions and are arranged as a set including sensor elements corresponding to the number of polarization directions, an examination method and a program according to one aspect of the present disclosure includes performing, on the basis of a detection value detected by each sensor element, the signal processing of generating an image acquired for a wider area than that detectable each time.

In one aspect of the present disclosure, a plurality of detection regions is included, for each of wavelength ranges, each including a plurality of sensor elements arranged in a matrix and configured to detect light with an identical wavelength range, and the plurality of sensor elements are arranged such that adjacent ones of the sensor elements detect light in different polarization directions and are arranged as a set including sensor elements corresponding to the number of polarization directions. Moreover, the signal processing of generating an image acquired for a wider area than that detectable each time is performed on the basis of a detection value detected by each sensor element.

Another aspect of the present disclosure, an imaging sensor including a plurality of wavelength detection regions. The plurality of wavelength detection regions including at least a first wavelength detection region. The first wavelength detection region includes a plurality of pixels configured to detect light within a first pre-determined wavelength range, and detect the light at different pre-determined polarization directions.

Another aspect of the present disclosure, an imaging method. The method includes detecting, with an image sensor, incident light. The method further includes outputting, with the imaging sensor, a plurality of image signals based on different polarizations of the incident light. A first one or more image signals of the plurality of image signals are indicative of the different polarizations of the incident light in a first pre-determined wavelength range. Additionally, a second one or more image signals of the plurality of image signals are indicative of the different polarizations of the incident light in a second pre-determined wavelength range. The first pre-determined wavelength range and the second pre-determined wavelength range are different from each other.

Yet another aspect of the present disclosure, a non-transitory computer-readable medium storing a program that, when executed by electronic processor, causes the electronic processor to perform a set of operations. The set of operations includes receiving a plurality of image signals from an image sensor. A first one or more image signals of the plurality of image signals are indicative of different polarizations of the incident light in a first pre-determined wavelength range. Additionally, a second one or more image signals of the plurality of image signals are indicative of different polarizations of the incident light in a second pre-determined wavelength range. The first pre-determined wavelength range and the second pre-determined wavelength range are different from each other. The set of operations further includes processing the plurality of image signals to generate an image that is based on a combination of the plurality of image signals.

Advantageous Effects

According to one aspect of the present disclosure, desired examination can be favorably performed.

BRIEF DESCRIPTION OF DRAWINGS

FIG. 8 is a view of a pixel arrangement example according to another arrangement rule of the minimum detection regions.

FIG. 9 is a view of a first variation of pixel arrangement of the detection device.

FIG. 10 is a view of a second variation of pixel arrangement of the detection device.

FIG. 11 is a view of a third variation of pixel arrangement of the detection device.

DESCRIPTION OF EMBODIMENTS

A specific embodiment to which the present technology has been applied will be described below in detail with reference to the drawings.

<Embodiment of Vegetation Examination Device>

Figure 1:
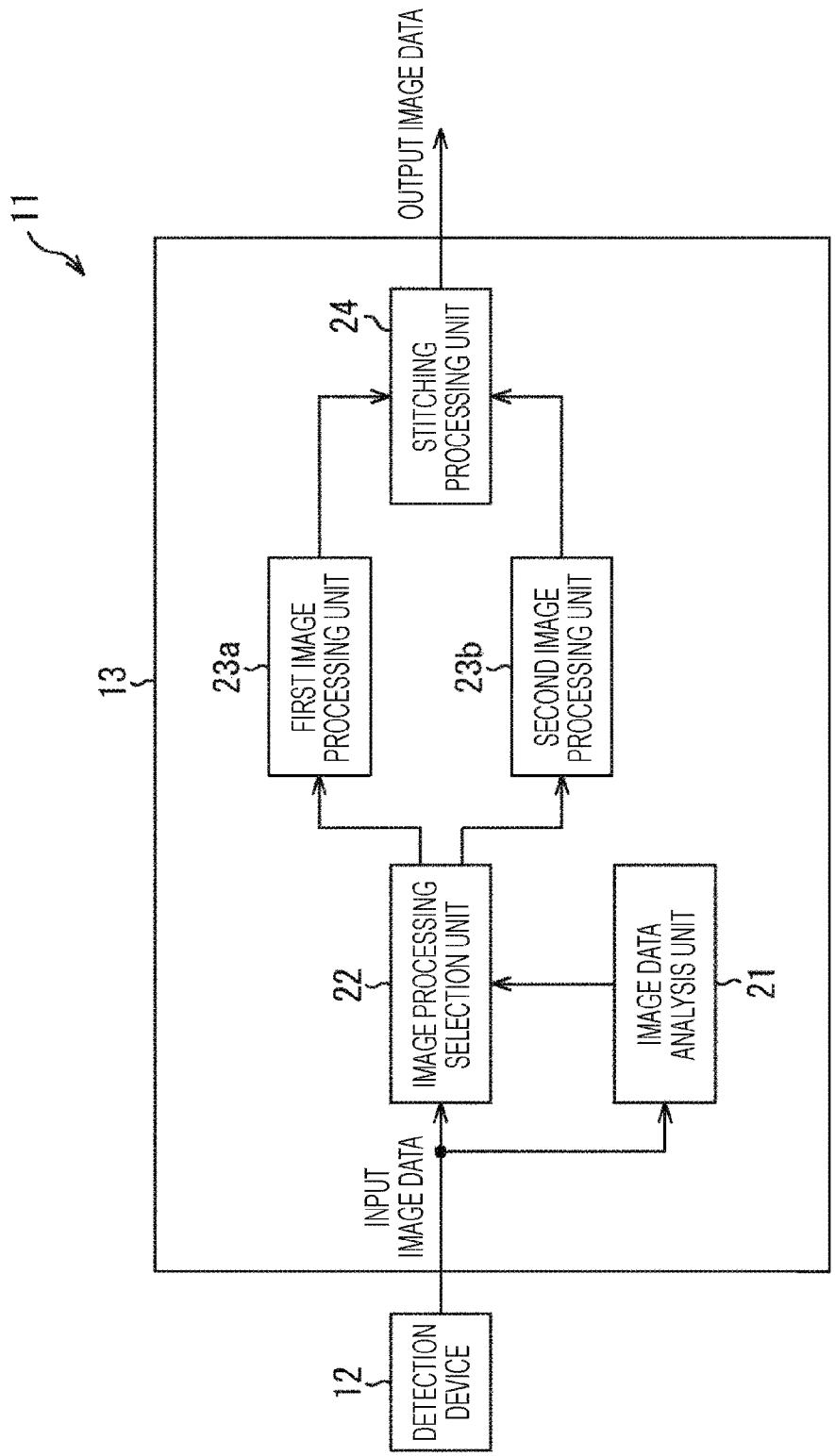
FIG. 1 is a block diagram of a configuration example of one embodiment of a vegetation examination device to which the present technology has been applied.

FIG. 1 is a block diagram of a configuration example of one embodiment of a vegetation examination device to which the present technology has been applied.

As illustrated in FIG. 1, a vegetation examination device 11 includes a detection device 12 and a signal processing device 13. The vegetation examination device 11 is utilized for examining a growing status including, e.g., the state and activity of vegetation of an examination target such as grass or crops.

The detection device 12 is, for example, an image sensor configured such that a plurality of pixels (sensor elements) are arranged in a matrix on a light receiving surface, and is configured to detect, for each pixel, the amount of light reflected on a surface of the examination target to acquire an image of the examination target. Moreover, the detection device 12 is configured to detect, by each pixel, light in a particular polarization direction with a particular wavelength range. For example, the detection device 12 is configured such that a polarization filter through which light in a predetermined polarization direction is transmitted and an optical filter through which light with a predetermined wavelength range is transmitted are stacked on a sensor substrate provided with photodiodes forming the pixels.

Figure 2:
FIG. 2 is a view of an example of pixel arrangement in a detection device.

For example, as illustrated in FIG. 2, the pixels for detection of light in different polarization directions are arranged adjacent to each other in the detection device 12. That is, a small square illustrated in FIG. 2 represents the pixel, and a number provided to each pixel represents the angle of the polarization direction. In an example of FIG. 2, the polarization direction is set every 45 degrees, and four pixels whose polarization directions are set at 0 degree, 45 degrees, 90 degrees, and 135 degrees are arranged adjacent to each other in a matrix of two rows×two columns. Moreover, in the detection device 12, these four pixels are arranged as each set. Note that the detection device 12 is not limited to detection of light in four polarization directions, and it may be configured such that light in at least three polarization directions is detected by three pixels arranged adjacent to each other.

Moreover, in the detection device 12, the pixels for detection of light with the same wavelength range are collectively arranged in a detection region for each wavelength range, for example. That is, as illustrated in FIG. 2, in the detection device 12, the pixels for detection of light with a red wavelength range are arranged in a red detection region R, the pixels for detection of light with a green wavelength range are arranged in a green detection region G, the pixels for detection of light with a blue wavelength range are arranged in a blue detection region B, and the pixels for detection of light with a near-infrared wavelength range are arranged in a near-infrared detection region IR.

The red detection region R, the green detection region G, the blue detection region B, and the near-infrared detection region IR are each formed in an elongated rectangular shape along a column direction (an upper-to-lower direction in FIG. 2), and are arranged in a row direction (a right-to-left direction in FIG. 2). As described above, the detection device 12 is configured such that the light receiving surface on which the plurality of pixels are arranged is divided into four regions of the red detection region R, the green detection region G, the blue detection region B, and the near-infrared detection region IR. Thus, the detection device 12 can acquire, per exposure, an image (hereinafter referred to as a "divided image" if necessary) for each wavelength range by the red detection region R, the green detection region G, the blue detection region B, and the near-infrared detection region IR, the detection regions being divided in the rectangular shape elongated in the column direction.

While moving relative to the examination target, the vegetation examination device 11 can continuously acquire multiple images at high speed in the detection device 12. These multiple images are used for examination of the examination target. At this point, the row direction in FIG. 2 is a moving direction of the detection device 12 so that the examination target can be sequentially scanned by each of the red detection region R, the green detection region G, the blue detection region B, and the near-infrared detection region IR. Moreover, upon examination of the examination target, the vegetation examination device 11 moves at such a moving speed that the divided images continuously acquired by the red detection region R, the green detection region G, the blue detection region B, and the near-infrared detection region IR overlap with each other in the row direction by equal to or greater than a predetermined width, for example.

As described above, the detection device 12 can detect light in four polarization directions for each pixel set, and can acquire the divided images with the wavelength ranges for the red detection region R, the green detection region G, the blue detection region B, and the near-infrared detection region IR. Then, the detection device 12 inputs image data as input image data to the signal processing device 13, the image data containing a pixel value according to the amount of light in the polarization direction with the wavelength range as described above.

As illustrated in FIG. 1, the signal processing device 13 includes an image data analysis unit 21, an image processing selection unit 22, a first image processing unit 23a, a second image processing unit 23b, and a stitching processing unit 24.

The image data analysis unit 21 is configured to analyze the input image data input from the detection device 12 to supply an analysis result to the image processing selection unit 22. For example, the image data analysis unit 21 obtains histogram of the pixel values in the input image data for a single image acquirable by the detection device 12, and obtains, for the detection region for each wavelength range, the number of pixels with pixel values smaller than a particular reference value. In this manner, the analysis result can be obtained.

For example, when examination of a special object or examination under a special light source is performed, an image appears or does not appear only in a detection region for a particular wavelength range. Thus, when the number of pixels with the pixel values smaller than the particular reference value is, as a result of analysis of the input image data by the image data analysis unit 21, less than a threshold in the detection region for any of the wavelength ranges, it can be determined that no image appears in the detection region for such a wavelength range.

The image processing selection unit 22 is configured to select, according to the analysis result supplied from the image data analysis unit 21, either one of image processing by the first image processing unit 23a or image processing by the second image processing unit 23b and supply the input image data from the detection device 12. For example, when images appear in the detection regions for all of the wavelength ranges, the image processing selection unit 22 selects the image processing by the first image processing unit 23a. When no image appears in any of the detection region for any of the wavelength ranges, the image processing selection unit 22 selects the image processing by the second image processing unit 23b.

That is, when the analysis result of the input image data shows that the number of pixels with the pixel values smaller than the particular reference value is equal to or greater than the threshold in the detection regions for all of the wavelength ranges, the image processing selection unit 22 supplies the input image data to the first image processing unit 23a. On the other hand, when the analysis result of the input image data shows that the number of pixels with the pixel values smaller than the particular reference value is less than the threshold in the detection region for any of the wavelength ranges, the image processing selection unit 22 supplies the input image data to the second image processing unit 23b.

As will be described later with reference to FIGS. 4 and 5, the first image processing unit 23a and the second image processing unit 23b are configured to perform the image processing for the input image data. Then, the first image processing unit 23a and the second image processing unit 23b supplies the stitching processing unit 24 with divided image data obtained by division of the input image data according to the wavelength range and coordinate data indicating a feature point coordinate on the image acquired by the detection device 12.

Every time the input image data on a single image is supplied from the detection device 12 to the signal processing device 13, the divided image data and the coordinate data are sequentially supplied from either one of the first image processing unit 23a or the second image processing unit 23b to the stitching processing unit 24. Then, the stitching processing unit 24 stitches, for each wavelength range, the continuously-supplied divided images, thereby generating an output image indicated by the pixel value for each wavelength range. That is, the stitching processing unit 24 performs, on the basis of the coordinate data indicating the feature point coordinate on the image, such synthesizing that shots common between adjacent divided images are superimposed on each other. In this manner, the stitching processing unit 24 generates an image larger than an image acquirable by single exposure in the detection device 12.

Specifically, the stitching processing unit 24 estimates corresponding feature points of the divided images. Then, the stitching processing unit 24 performs the image processing of moving or deforming the divided images such that the feature points thereof overlap with each other, and performs the image processing of blending the pixel values of the overlapping portions of the divided images with the matched feature point.

With this configuration, the stitching processing unit 24 can generate a single output image of the examination target with a high resolution across a wide area when the images of the examination target are continuously acquired by the detection device 12 and image acquisition for the entire examination target region of the examination target is completed, for example. Then, the stitching processing unit 24 outputs, as output image data, data containing the wide high-resolution output image (the image acquired for a wider area than that of a single image acquired by the detection device 12).

The wide high-resolution output image generated in the signal processing device 13 will be described with reference to FIG. 3.

Figure 3:
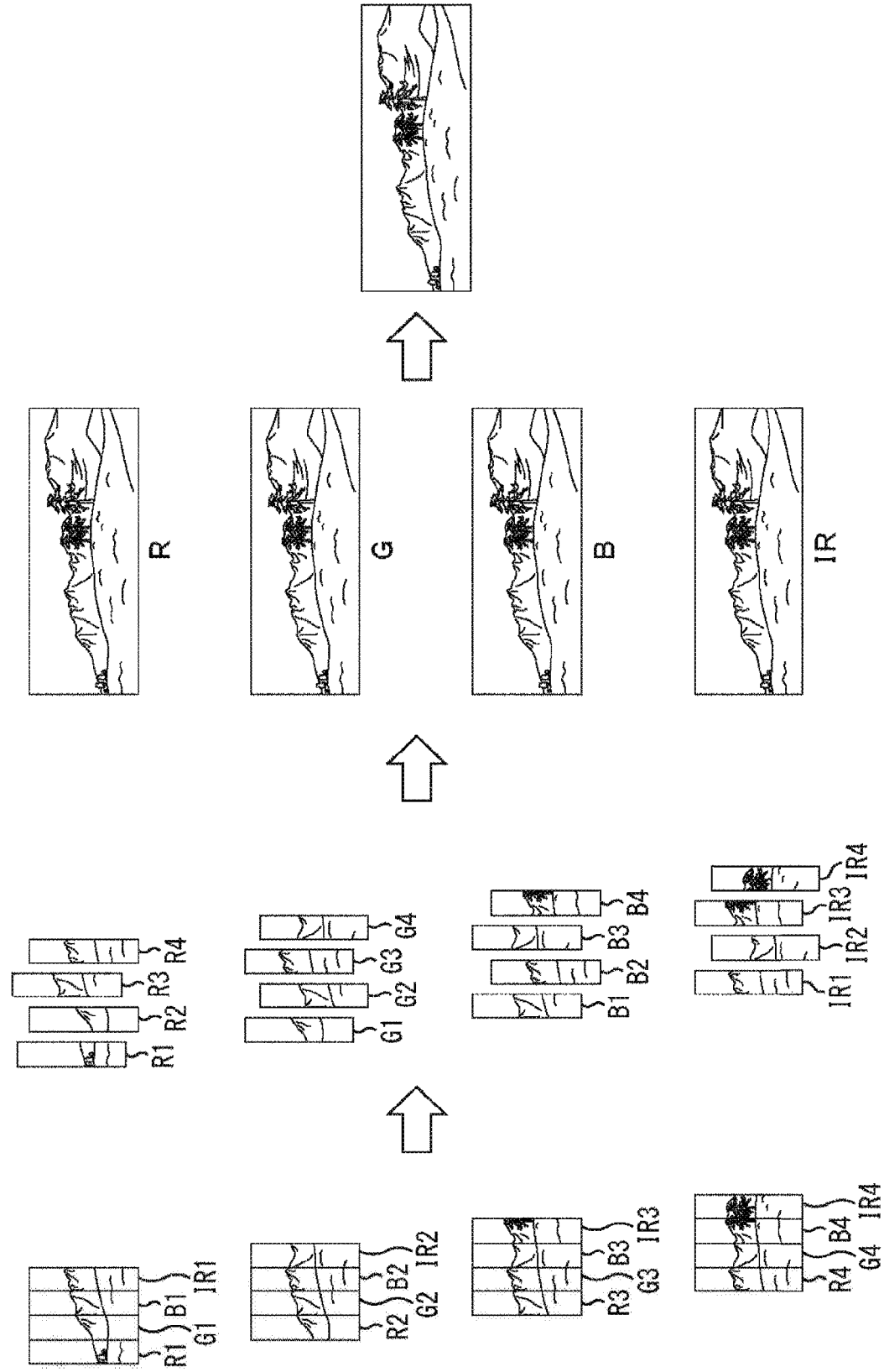
FIG. 3 is a view for describing the processing of generating a wide output image.

For example, multiple images (four images in an example of FIG. 3) continuously acquired by the detection device 12 are illustrated in the order from the top to the bottom at the left end of FIG. 3. For example, a first image includes a divided image R1 corresponding to the red detection region R, a divided image G1 corresponding to the green detection region G, a divided image B1 corresponding to the blue detection region B, and a divided image IR1 corresponding to the near-infrared detection region IR. Moreover, second to fourth images are also configured as in the first image. Note that after these four images, the detection device 12 sequentially and continuously acquires multiple images while moving along the moving direction of FIG. 2, and these images are supplied to the signal processing device 13.

Then, in the signal processing device 13, each image supplied from the detection device 12 is divided into divided images, and the divided images with the same wavelength range are sequentially stitched in the stitching processing unit 24. For example, the divided red image R1 from the first image, the divided red image R2 from the second image, the divided red image R3 from the third image, and the divided red image R4 from the fourth image are sequentially stitched in the stitching processing unit 24. Similarly, the divided red images from the images supplied from the detection device 12 after the fourth image are sequentially stitched in the stitching processing unit 24 during movement along the moving direction of FIG. 2. Note that divided images for other wavelength ranges are, according to the wavelength range, stitched in the stitching processing unit 24.

With this configuration, the signal processing device 13 can acquire a wide high-resolution output image R generated by stitching of the divided red images, a wide high-resolution output image G generated by stitching of the divided green images, a wide high-resolution output image B generated by stitching of the divided blue images, and a wide high-resolution output image IR generated by stitching of the divided near-infrared images. Then, as illustrated at the right end of FIG. 3, the signal processing device 13 may output, as output image data (color image data+near-infrared image data) in the form of collecting data as one, output image data containing the output image R, the output image G, the output image B, and the output image IR, for example.

The vegetation examination device 11 is configured as described above, and can acquire the wide high-resolution output image for each predetermined wavelength range. Thus, vegetation examination using a normalized difference vegetation index NDVI obtained from the output red image G and the output near-infrared image IR can be finely performed across a wide area such as a field, for example.

Figure 4:
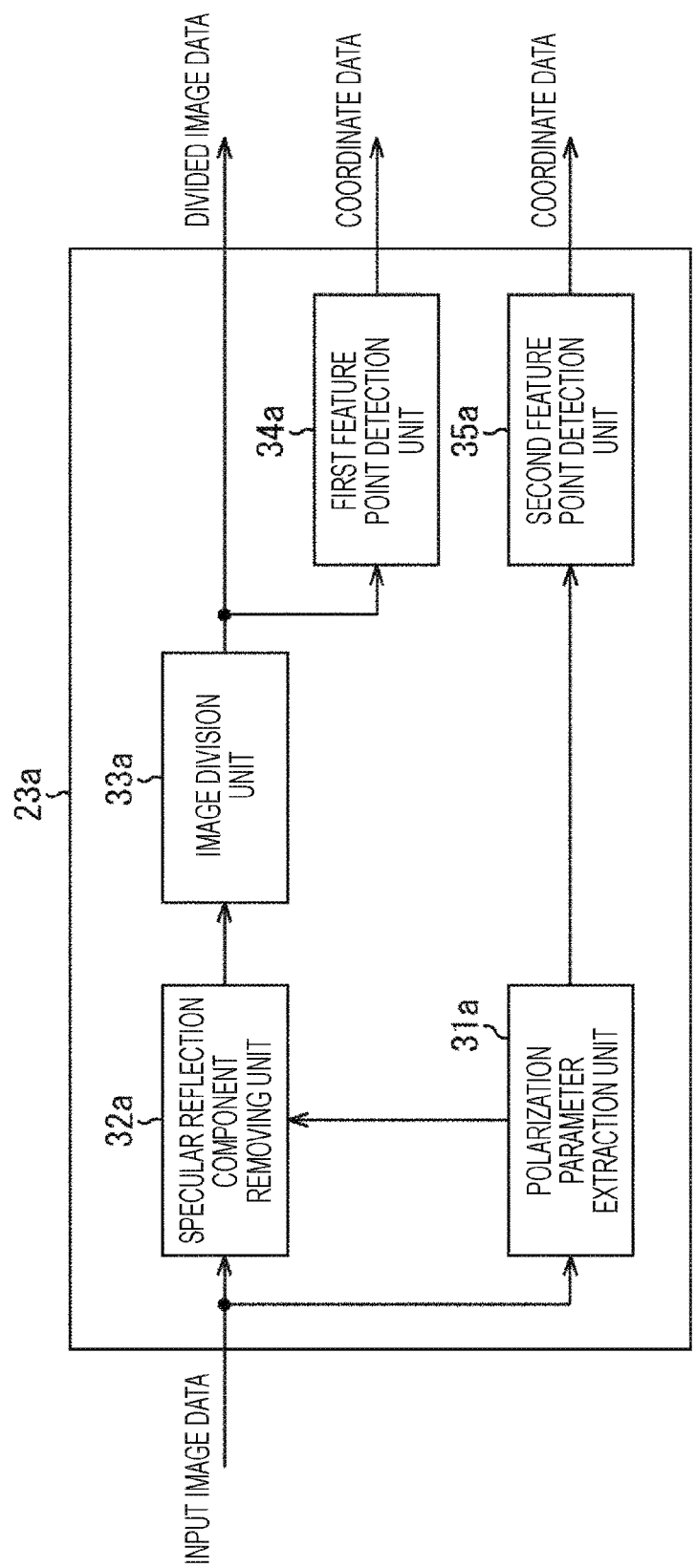
FIG. 4 is a block diagram of a configuration example of a first image processing unit.

Next, FIG. 4 is a block diagram of a configuration example of the first image processing unit 23a of FIG. 1.

As illustrated in FIG. 4, the first image processing unit 23a includes a polarization parameter extraction unit 31a, a specular reflection component removing unit 32a, an image division unit 33a, a first feature point detection unit 34a, and a second feature point detection unit 35a.

The polarization parameter extraction unit 31a is configured to extract, on the basis of the input image data supplied from the detection device 12, a polarization parameter indicating a light polarization state on the surface of the examination target, thereby supplying the polarization parameter to the specular reflection component removing unit 32a and the second feature point detection unit 35a. The polarization parameter includes, for example, a polarization degree indicating the degree of polarization when light is reflected on the surface of the examination target, and a normal vector indicating the angle of the normal line of the surface of the examination target with respect to the detection device 12. As described above with reference to FIG. 2, the detection device 12 is configured such that adjacent four pixels detect light in the polarization directions set every 45 degrees. Thus, the polarization parameter extraction unit 31a can extract, on the basis of polarization information (a pixel value difference corresponding to a difference in the polarization direction among the pixels) obtained from pixel values of these four pixels, the parameter of polarization on the surface of the examination target detected by these four pixels.

The specular reflection component removing unit 32a is configured to remove, on the basis of the polarization parameter supplied from the polarization parameter extraction unit 31a, a specular reflection component as a component of light specularly-reflected on the surface of the examination target from the input image data supplied from the detection device 12. For example, light reflected on the surface of the examination target typically contains a polarized specular reflection component and a non-polarized diffuse reflection component.

Thus, on the basis of an assumption that the diffuse reflection component and the specular reflection component are statistically independent from each other, the specular reflection component removing unit 32a can remove the specular reflection component by a technique called "independent component analysis (ICA)," for example. Then, the specular reflection component removing unit 32a acquires, from the image acquired from the detection device 12, an image from which influence of the specular reflection component has been eliminated, and then, supplies such image data to the image division unit 33a.

The image division unit 33a is configured to divide, according to the detection regions for the wavelength ranges detected by the detection device 12, the image data supplied from the specular reflection component removing unit 32a, thereby supplying the first feature point detection unit 34a and the stitching processing unit 24 (FIG. 1) with the divided image data for each wavelength range.

The first feature point detection unit 34a is configured to detect a feature point indicating a characteristic portion of an object of the image based on the divided image data, thereby supplying the stitching processing unit 24 with the coordinate data indicating the coordinate of the feature point. For example, an edge of a portion with a greater change in brightness or color on the image may be used as the feature point.

The second feature point detection unit 35a is configured to detect a feature point indicating a characteristic portion of an object of the image on which the polarization parameter supplied from the polarization parameter extraction unit 31a is mapped, thereby supplying the stitching processing unit 24 with the coordinate data indicating the coordinate of the feature point.

The first image processing unit 23a is configured as described above, and can supply the stitching processing unit 24 with the divided image data from which the specular reflection component is removed and which is divided for each wavelength range, the coordinate data indicating the coordinate of the feature point obtained from the divided image for each wavelength range, and the coordinate data indicating the coordinate of the feature point on the image acquired on the basis of the polarization parameter.

Figure 5:
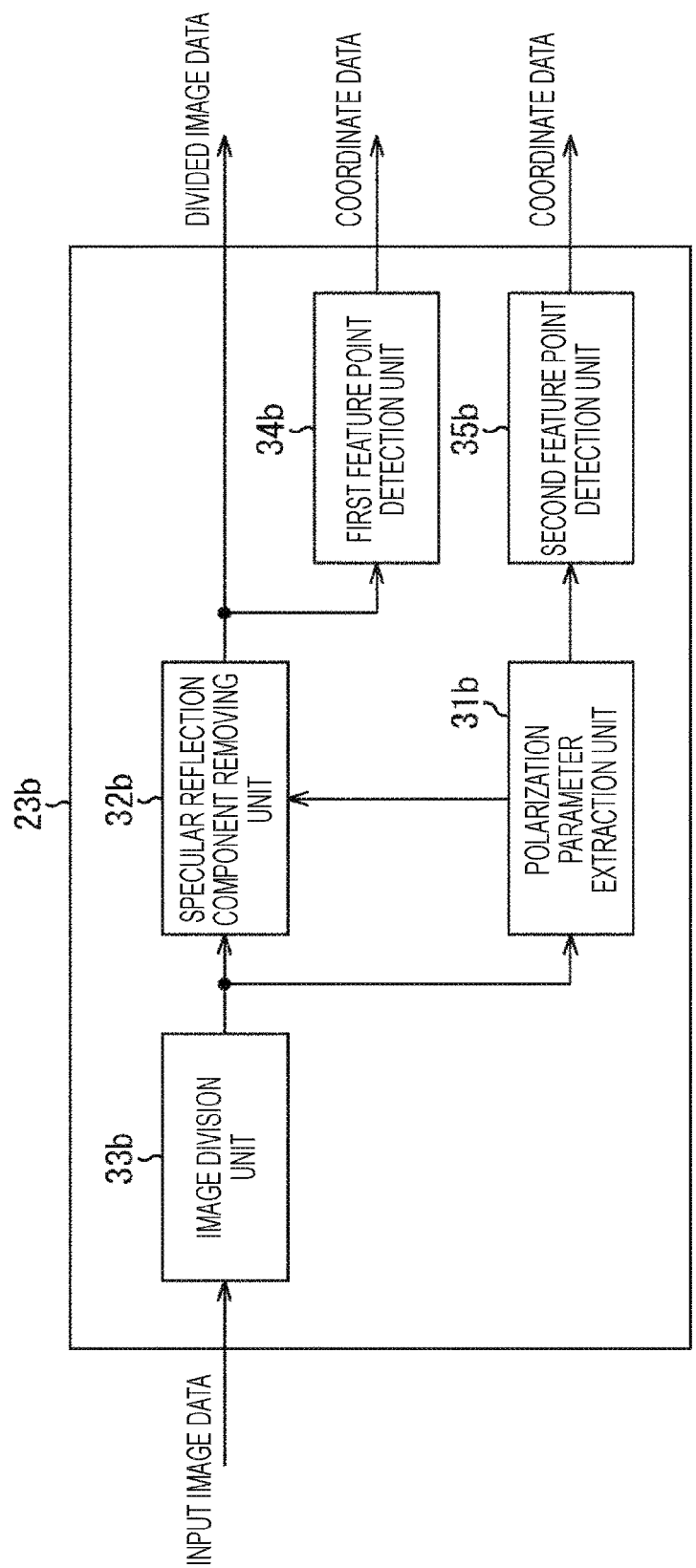
FIG. 5 is a block diagram of a configuration example of a second image processing unit.

Next, FIG. 5 is a block diagram of a configuration example of the second image processing unit 23b of FIG. 1.

As illustrated in FIG. 5, the second image processing unit 23b includes, as in the first image processing unit 23a of FIG. 2, a polarization parameter extraction unit 31b, a specular reflection component removing unit 32b, an image division unit 33b, a first feature point detection unit 34b, and a second feature point detection unit 35b. Note that the second image processing unit 23b is configured such that a processing order is different from that of the first image processing unit 23a of FIG. 2.

As illustrated in the figure, the input image data is supplied from the detection device 12 to the image division unit 33b in the second image processing unit 23b, and the image division unit 33b divides such image data according to the detection regions for the wavelength ranges in the detection device 12. Then, the image division unit 33b supplies the polarization parameter extraction unit 31b and the specular reflection component removing unit 32b with the divided image data for each wavelength range. Thus, in the second image processing unit 23b, the polarization parameter extraction unit 31b extracts the polarization parameter from the divided image data for each wavelength range, and the specular reflection component removing unit 32b removes the specular reflection component from the divided image data for each wavelength range. Subsequently, the first feature point detection unit 34b and the second feature point detection unit 35b extract the above-described feature points, and supply the stitching processing unit 24 with the coordinate data indicating the coordinate of each feature point.

The second image processing unit 23b configured as described above can supply the stitching processing unit 24 with the divided image data from which the specular reflection component is removed and which is divided for each wavelength range, the coordinate data indicating the coordinate of the feature point obtained from the divided image for each wavelength range, and the coordinate data indicating the coordinate of the feature point on the image acquired on the basis of the polarization parameter.

Thus, in the signal processing device 13, the stitching processing unit 24 can stitch the divided images on the basis of the coordinate data indicating the coordinate of the feature point obtained from the divided image for each wavelength range and the coordinate data indicating the coordinate of the feature point on the image acquired on the basis of the polarization parameter. As described above, the stitching processing unit 24 can use more feature points to improve stitch accuracy.

Moreover, the polarization parameter does not typically depend on an object color. Thus, the stitching processing unit 24 can use, without influence of a color filter, the feature point based on the polarization parameter for positioning within the entire size of the detection device 12. This allows the stitching processing unit 24 to perform stitching with a higher accuracy.

<Signal Processing>

Figure 6:
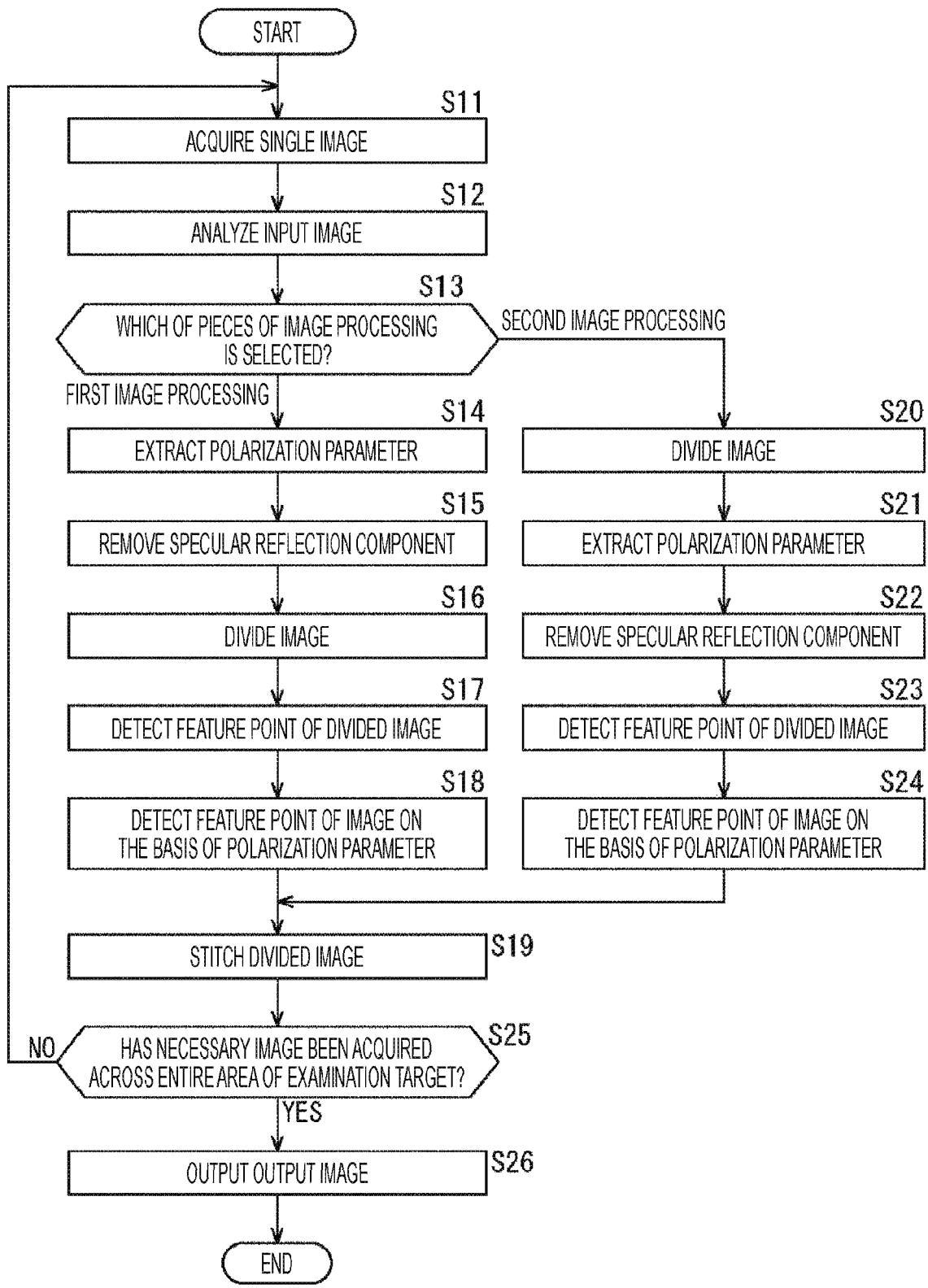
FIG. 6 is a flowchart for describing the processing of acquiring a wide high-resolution image.

FIG. 6 is a flowchart for describing the processing of acquiring the wide high-resolution image by the vegetation examination device 11.

For example, the processing begins when the vegetation examination device 11 arrives at a start point for examination of the examination target, and the vegetation examination device 11 moves in the moving direction as illustrated in FIG. 2. Then, at a step S11, the detection device 12 acquires a single image by single exposure, and supplies the signal processing device 13 with input image data on such an image.

At a step S12, the image data analysis unit 21 of the signal processing device 13 analyzes the input image supplied from the detection device 12 at the step S11, and supplies the image processing selection unit 22 with such an analysis result.

At a step S13, the image processing selection unit 22 determines, according to the analysis result supplied from the image data analysis unit 21 at the step S12, whether the image processing by the first image processing unit 23a or the image processing by the second image processing unit 23b is to be performed as the image processing for the input image.

At a step S13, when the image processing selection unit 22 determines that the image processing by the first image processing unit 23a is to be performed for the input image, the image processing selection unit 22 supplies the input image to the first image processing unit 23a, and the processing proceeds to a step S14.

At the step S14, the polarization parameter extraction unit 31a of the first image processing unit 23a extracts, on the basis of pixel values of adjacent four pixels different from each other in the polarization direction, the polarization parameter from the image acquired by the detection device 12.

At a step S15, the specular reflection component removing unit 32a removes, on the basis of the polarization parameter extracted by the polarization parameter extraction unit 31a at the step S14, the specular reflection component from the image acquired by the detection device 12.

At a step S16, the image division unit 33a divides the image according to the wavelength range detected by the detection device 12, the specular reflection component being removed from the image by the specular reflection component removing unit 32a at the step S15. Then, the image division unit 33a supplies the first feature point detection unit 34a and the stitching processing unit 24 with the divided image for each wavelength range.

At a step S17, the first feature point detection unit 34a detects a feature point indicating a characteristic portion of an object of the divided image supplied from the image division unit 33a at the step S16. Then, the first feature point detection unit 34a supplies the stitching processing unit 24 with the coordinate data indicating the coordinate of the feature point detected from each divided image.

At a step S18, the second feature point detection unit 35a detects, on the basis of the polarization parameter supplied from the polarization parameter extraction unit 31a, a feature point indicating a characteristic portion of an object of the image on which the polarization parameter is mapped. Then, the second feature point detection unit 35a supplies the stitching processing unit 24 with the coordinate data indicating the coordinate of the feature point detected for the entire image acquired by the detection device 12 on the basis of the polarization parameter.

At a step S19, the stitching processing unit 24 stitches the divided images on the basis of the feature points indicated by the coordinate data supplied at the steps S17 and S18, the divided images being supplied from the image division unit 33a at the step S16.

On the other hand, when the image processing selection unit 22 determines, at the step S13, that the image processing by the second image processing unit 23b is to be performed for the input image, the image processing selection unit 22 supplies the input image to the second image processing unit 23b, and the processing proceeds to a step S20.

At the step S20, the image division unit 33b of the second image processing unit 23b divides the image acquired by the detection device 12 according to the wavelength range detected by the detection device 12. Then, the image division unit 33b supplies the polarization parameter extraction unit 31b and the specular reflection component removing unit 32b with the divided image for each wavelength range.

At a step S21, the polarization parameter extraction unit 31b extracts, for each image divided by the image division unit 33b, the polarization parameter on the basis of pixel values of adjacent four pixels different from each other in the polarization direction.

At a step S22, the specular reflection component removing unit 32b removes, on the basis of the polarization parameter extracted by the polarization parameter extraction unit 31b at the step S21, the specular reflection component from each image divided by the image division unit 33b. Then, the specular reflection component removing unit 32b supplies the first feature point detection unit 34b and the stitching processing unit 24 with the divided image from which the specular reflection component is removed.

At a step S23, the first feature point detection unit 34b detects a feature point indicating a characteristic portion of an object of the divided image supplied from the specular reflection component removing unit 32b at the step S22. Then, the first feature point detection unit 34b supplies the stitching processing unit 24 with the coordinate data indicating the coordinate of the feature point detected from each divided image.

At a step S24, the second feature point detection unit 35b detects, on the basis of the polarization parameter supplied from the polarization parameter extraction unit 31b, a feature point indicating a characteristic portion of an object of the image on which the polarization parameter is mapped. Then, the second feature point detection unit 35b supplies the stitching processing unit 24 with the coordinate data indicating the coordinate of the feature point detected for the entire image acquired by the detection device 12 on the basis of the polarization parameter.

Then, the processing proceeds to the step S19. In this case, the stitching processing unit 24 stitches the divided images on the basis of the feature points indicated by the coordinate data supplied at the steps S23 and S24, the divided images being supplied from the image division unit 33a at the step S20.

After the processing of the step S19, the processing proceeds to a step S25, and the detection device 12 determines, across the entire area of the examination target, whether or not a necessary image has been acquired. For example, the detection device 12 can determine as the necessary image having been acquired when the processing is performed from the start point for examination of the examination target and the vegetation examination device 11 has reached an end point.

At the step S25, when the detection device 12 determines that the necessary image has not been acquired, i.e., when the vegetation examination device 11 does not reach the end point, the processing returns to the step S11, and similar processing is repeated thereafter.

On the other hand, when the detection device 12 determines, at the step S25, that the necessary image has been acquired, i.e., when the vegetation examination device 11 has reached the end point, the processing proceeds to a step S26.

In this case, the stitching processing unit 24 generates a wide high-resolution image across the entire area of the examination target. At the step S26, the signal processing device 13 outputs, as an output image, the image generated by the stitching processing unit 24, and then, the processing is terminated.

As described above, the vegetation examination device 11 can acquire, for each wavelength range detectable by the detection device 12, a wide high-resolution image across the entire area of the examination target.

<Pixel Arrangement in Detection Device>

Regarding pixel arrangement in the detection device 12, the above-described arrangement example of FIG. 2 is schematically illustrated for the sake of easy understanding of description. In the detection device 12, millions or tens of millions of minute pixels are actually arranged on the light receiving surface. Moreover, in the detection device 12, these pixels are, as illustrated in FIG. 2, arranged such that the light receiving surface is divided into four detection regions according to the wavelength range. Moreover, pixel arrangement in the detection device 12 is not limited to the example illustrated in FIG. 2.

Pixel arrangement in the detection device 12 will be described with reference to FIGS. 7 to 12.

Figure 7:
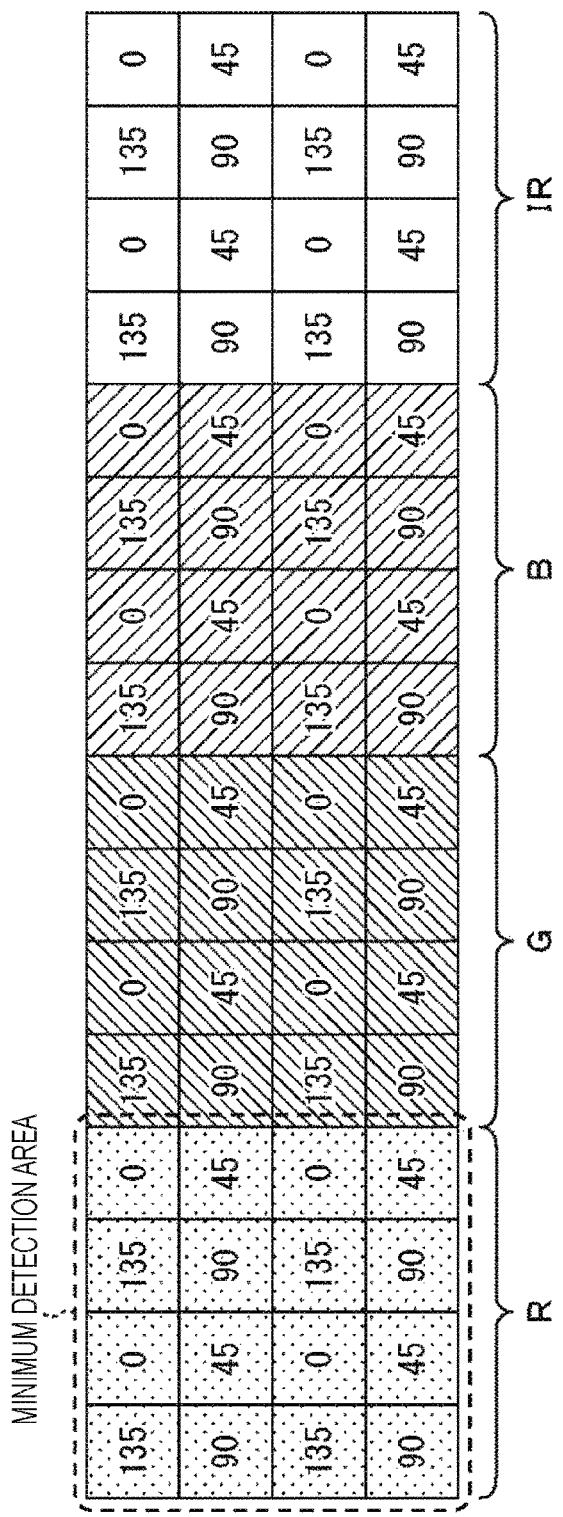
FIG. 7 is a view for describing an arrangement rule of minimum detection regions of pixels.

FIG. 7 is a view for describing the rule of arrangement of minimum detection regions of the pixels in the detection device 12.

As illustrated in FIG. 7, 16 pixels including four pixels in the row direction and four pixels in the column direction are collectively arranged as the pixels configured to detect light with the same wavelength range to form the minimum detection region in the detection device 12. Moreover, in the detection device 12, four pixels whose polarization directions are set every 45 degrees are, as described above, arranged adjacent to each other in 2×2, and 16 pixels form such a minimum detection region that the pixel sets each including four pixels are arranged in 2×2.

Moreover, the minimum red detection region R, the minimum green detection region G, the minimum blue detection region B, and the minimum near-infrared detection region IR are, in the detection device 12, arranged along the moving direction (the row direction in FIG. 7) as the direction in which the detection device 12 moves relative to the examination target. That is, the minimum red detection region R, the minimum green detection region G, the minimum blue detection region B, and the minimum near-infrared detection region IR are arranged according to such an arrangement rule that these regions are surely arranged as viewed in the moving direction of the detection device 12. With this configuration, when the detection device 12 performs single-line scanning of the examination target, divided images of the examination target for all of the wavelength ranges can be acquired for such a single line, for example.

Moreover, in the detection device 12, the minimum detection region is set to have a size twice as large as a polarization filter pattern cycle (2×2) in the row direction and the column direction. The minimum detection region is set as described above, and the detection device 12 continuously acquires images such that these images overlap with each other by at least a width corresponding to two pixels while moving relative to the examination target, for example. With this configuration, the signal processing device 13 can stitch the divided images by the stitching processing unit 24, and can output a wide high-resolution output image for each wavelength range detectable by the detection device 12.

Figure 8:
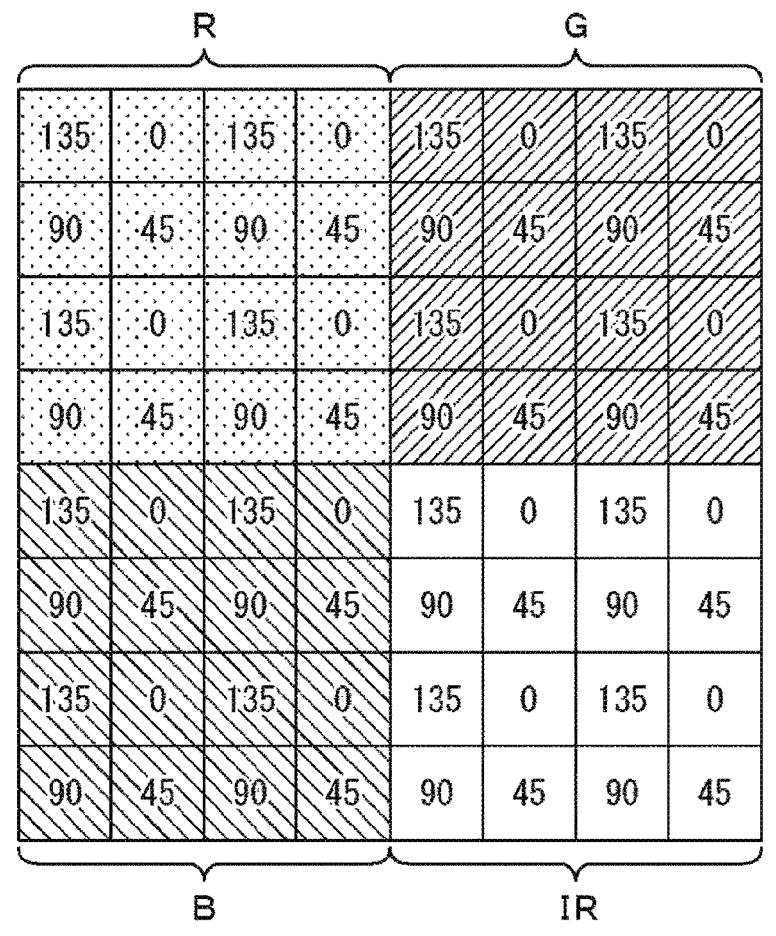

FIG. 8 is a view of a pixel arrangement example of the minimum detection regions according to another arrangement rule.

As illustrated in FIG. 8, the minimum red detection region R, the minimum green detection region G, the minimum blue detection region B, and the minimum near-infrared detection region IR can be arranged according to an arrangement rule of a matrix of 2 rows×2 columns in the detection device 12.

By employing the detection device 12 with such arrangement of the minimum detection regions, the vegetation examination device 11 moves to sequentially scan the examination target by each minimum detection region so that a wide high-resolution output image for each wavelength range detectable by the detection device 12 can be output.

Figure 9:
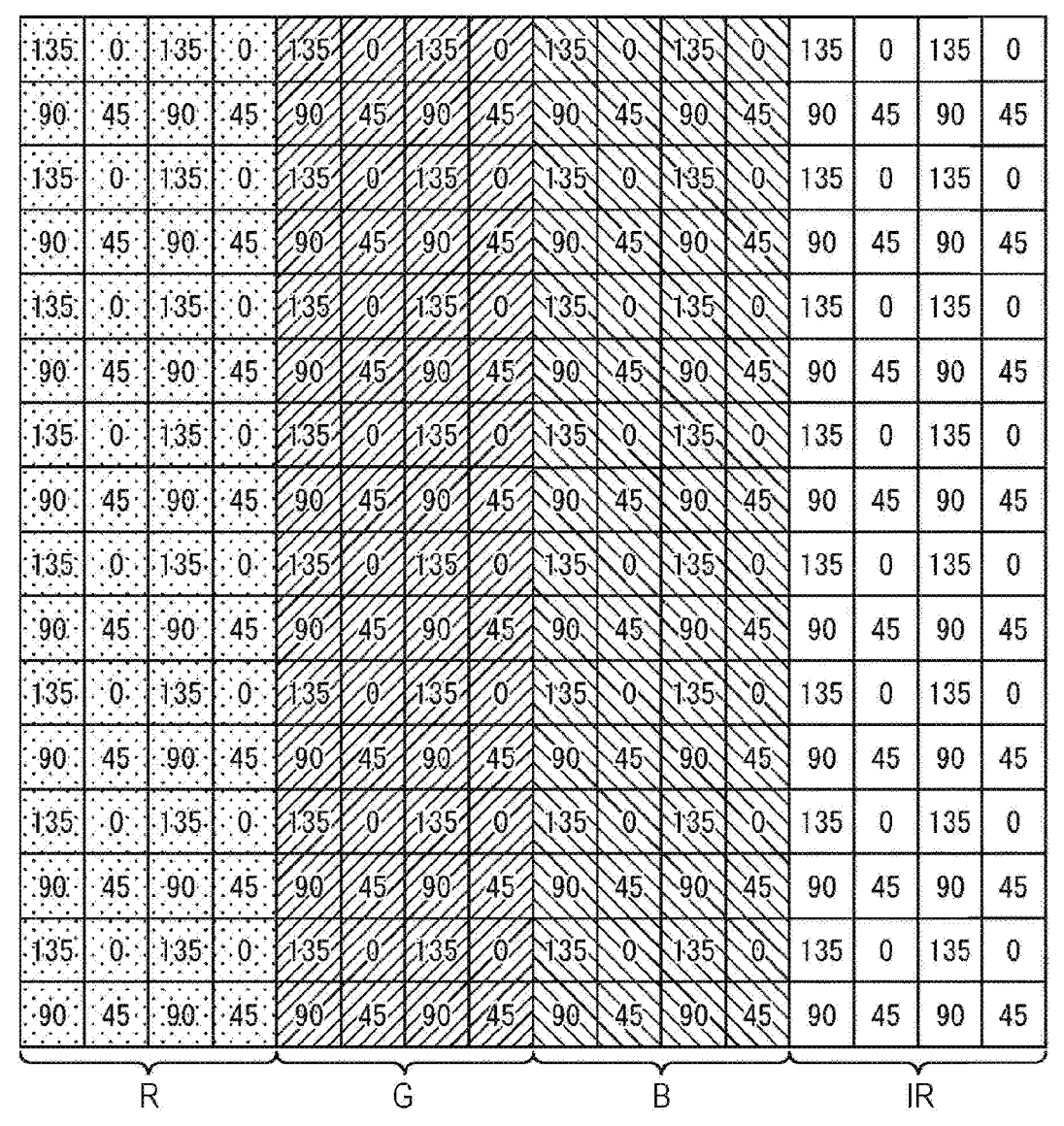

FIG. 9 is a view of a first variation of pixel arrangement.

As illustrated in FIG. 9, the pixels are arranged in the detection device 12 such that the red detection region R, the green detection region G, the blue detection region B, and the near-infrared detection region IR are each in a rectangular shape more elongated in the column direction as compared to pixel arrangement illustrated in FIG. 2.

Figure 10:
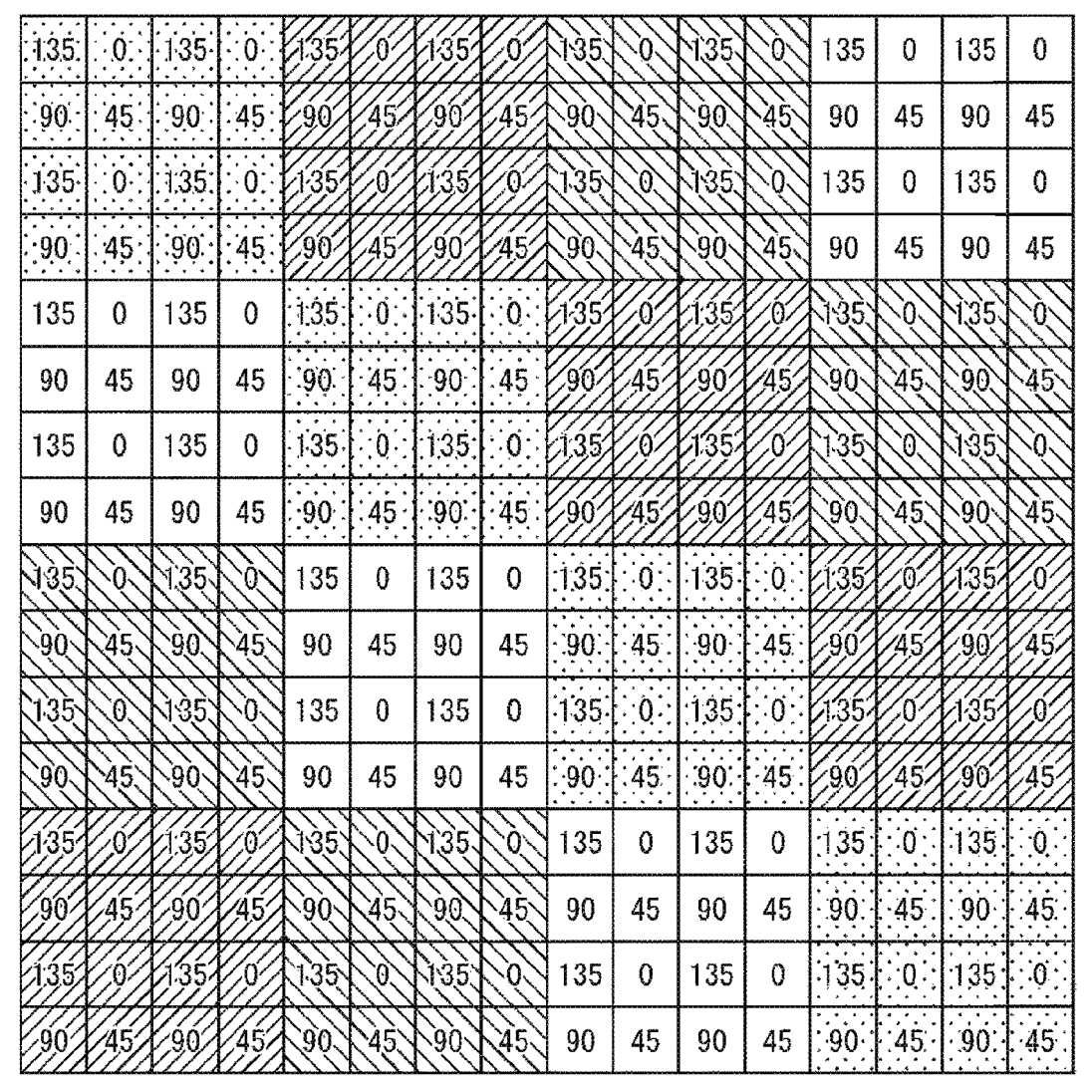

FIG. 10 is a view of a second variation of pixel arrangement.

As illustrated in FIG. 10, the pixels are, in the detection device 12, arranged according to such an arrangement rule that the red detection region R, the green detection region G, the blue detection region B, and the near-infrared detection region IR are surely arranged as viewed in the row direction and the column direction. That is, in a pixel arrangement example illustrated in FIG. 10, the detection regions for all of the wavelength ranges are arranged when 16 detection regions are viewed in the row direction and the column direction, the detection regions being arranged in a matrix of four rows×four columns.

Note that in the pixel arrangement example illustrated in FIG. 10, the order of arrangement of the detection region for each wavelength range is schematically illustrated, and a single detection region is illustrated as the minimum detection region described with reference to FIG. 7. However, each detection region may have a larger size. For example, the entire light receiving surface of the detection device 12 may be divided into 16 detection regions. Alternatively, a detection region including more pixels may be repeatedly disposed in a pattern as illustrated in FIG. 10.

FIG. 11 is a view of a third variation of pixel arrangement.

As illustrated in FIG. 11, e.g., a detection region including pixels configured to detect non-polarized light with all wavelength ranges can be, in the detection device 12, disposed in addition to the red detection region R, the green detection region G, the blue detection region B, and the near-infrared detection region IR. That is, the detection device 12 may have the detection region where no polarization filter and no color filter are provided. On the basis of pixel values of the pixels arranged in such a detection region, the signal processing device 13 can acquire a white (black-and-white) image with light in any polarization directions.

Figure 12:
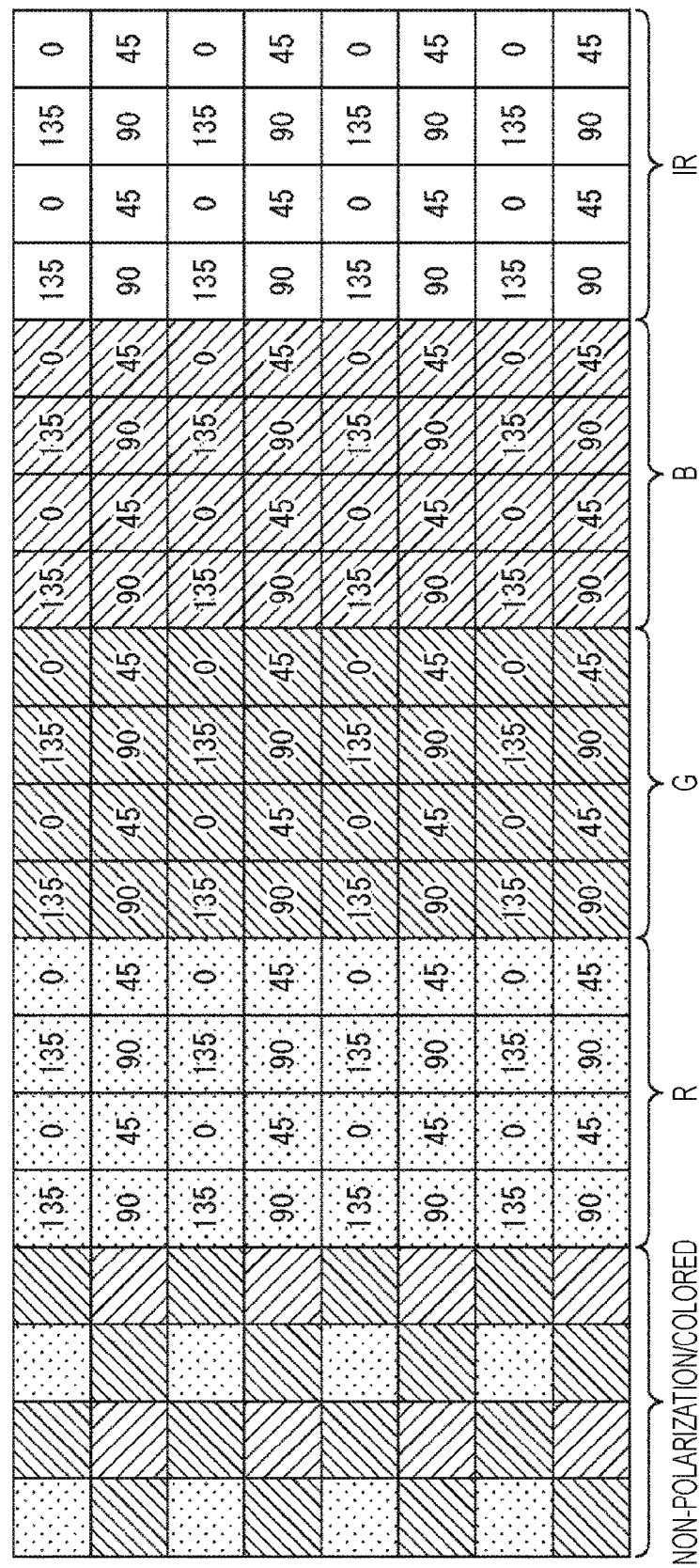
FIG. 12 is a view of a fourth variation of pixel arrangement of the detection device.

FIG. 12 is a view of a fourth variation of the pixel arrangement.

As illustrated in FIG. 12, a detection region including pixels configured to detect non-polarized light with three primary colors can be, in the detection device 12, disposed in addition to the red detection region R, the green detection region G, the blue detection region B, and the near-infrared detection region IR. That is, the detection device 12 may have the detection region where no polarization filter is provided and a color filter with a Bayer array of three primary colors is provided for each pixel. On the basis of pixel values of the pixels arranged in such a detection region, the signal processing device 13 can acquire a color image with light in any polarization directions.

<Example Applications of Vegetation Examination Device>

Figure 13:
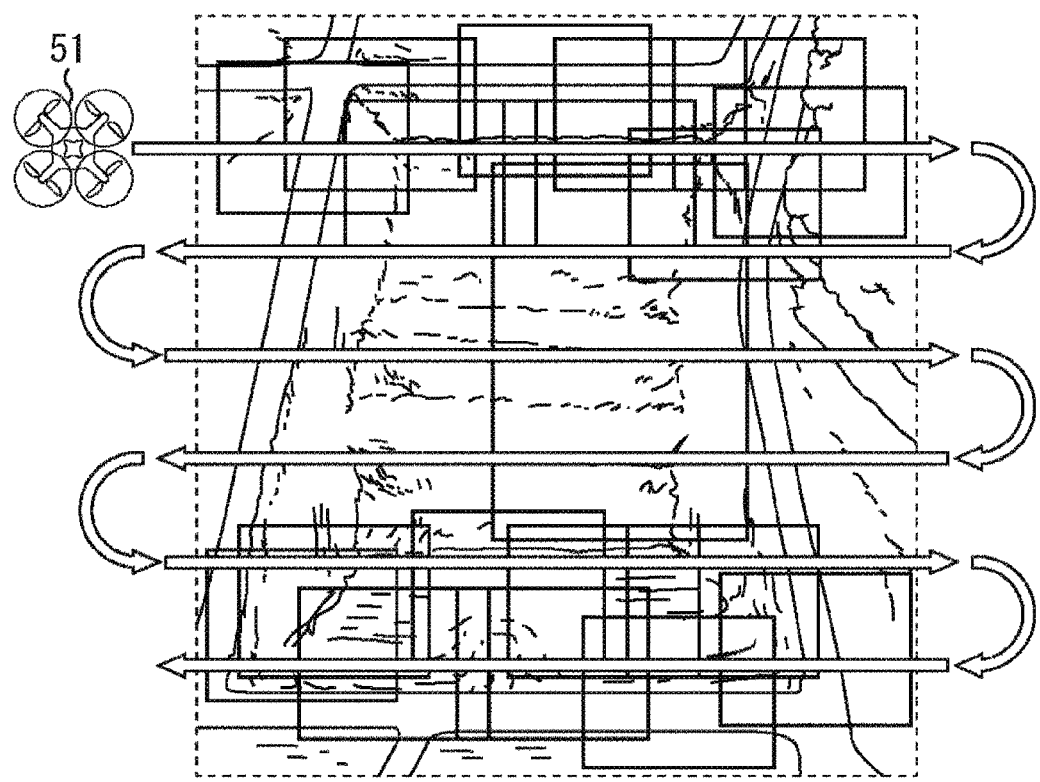
FIG. 13 is a view for describing an example application of a vegetation examination device.
Figure 14:
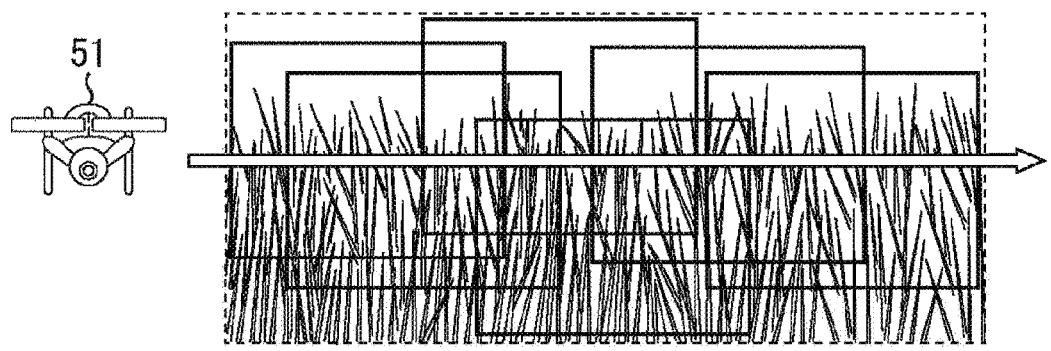
FIG. 14 is a view for describing another example application of the vegetation examination device.

As illustrated in FIGS. 13 and 14, the vegetation examination device 11 is mounted on, e.g., an unmanned aerial vehicle (UAV) 51 so that the unmanned aerial vehicle 51 can examine the examination target while moving.

FIG. 13 illustrates an example application in which the vegetation examination device 11 is fixed to the unmanned aerial vehicle 51 with the detection device 12 facing downward and acquires, from above, a planar output image of crops across a wide area of a field right below the vegetation examination device 11, for example. FIG. 14 shows an example application in which the vegetation examination device 11 is fixed to the unmanned aerial vehicle 51 with the detection device 12 facing a lateral side and acquires, while moving on a footpath, an output image of a growing status such as the height of crops across a wide area, for example.

Note that in FIGS. 13 and 14, solid rectangles indicate multiple images acquired per exposure by the detection device 12, and a dashed rectangle indicates an output image generated by stitching of these images. Moreover, white arrows indicate a moving path of the unmanned aerial vehicle 51.

As described above, the unmanned aerial vehicle 51 equipped with the vegetation examination device 11 continuously acquires multiple images while moving, and therefore, the vegetation examination device 11 can acquire a single output image of the examination target with a high resolution across a wide area. Thus, such an output image can be used for detailed examination of vegetation of crops in a wide area such as a field.

Moreover, when the vegetation examination device 11 can obtain information on a sensor provided at the unmanned aerial vehicle 51, stitching is also performed by the stitching processing unit 24 on the basis of information on the position and attitude of the unmanned aerial vehicle 51, and therefore, an output image stitched with a high accuracy can be acquired.

Note that in the vegetation examination device 11, the size of the detection region for each wavelength range can be properly selected according to, e.g., the size of the detection device 12 or the speed of movement of the vegetation examination device 11. Moreover, regarding the number of wavelength ranges (i.e., the number of colors of the color filters) to be detected by the detection device 12, the necessary number of wavelength ranges can be, in the vegetation examination device 11, properly selected according to applications of examination by the vegetation examination device 11.

For example, it is assumed that a certain degree of variation in the amount and direction of movement of the unmanned aerial vehicle 51 is caused in the application of examining the entirety of a wide field by means of the unmanned aerial vehicle 51, as described above with reference to FIGS. 13 and 14. For this reason, the size of each detection region is preferably increased (i.e., each detection region preferably includes more pixels) to reliably stitch the divided images. On the other hand, in the application of examination by fine minute movement of the vegetation examination device 11, such as the application of discovering a small scratch of a small precision component, the size of the detection region may be decreased.

The present technology is further applicable not only to a vegetation examination system including only a device such as the vegetation examination device 11, but also to a vegetation examination system connected via a network, for example. For example, it can be configured such that the detection device 12 and the signal processing device 13 are connected together via the network and that an image output from the signal processing device 13 is transmitted to a display device or an analysis device via the network. With this configuration, e.g., many fields in remote locations can be examination targets, and examination can be performed anywhere.

Note that each type of processing described with reference to the above-described flowchart is not necessarily executed in chronological order as described in the flowchart, and includes processing (e.g., parallel processing or object processing) executed in parallel or individually. Moreover, a single CPU may process a program, or distributed processing may be performed for the program by a plurality of CPUs. Further, in the present specification, the system indicates an entire device including a plurality of devices.

Moreover, the above-described series of processing (the signal processing method) can be executed by hardware, or can be executed by software. When the series of processing is executed by the software, a program forming the software is, from a program recording medium configured to record the program, installed in a computer built in the dedicated hardware or a general-purpose personal computer configured to execute various functions by installation of various programs, for example.

Figure 15:
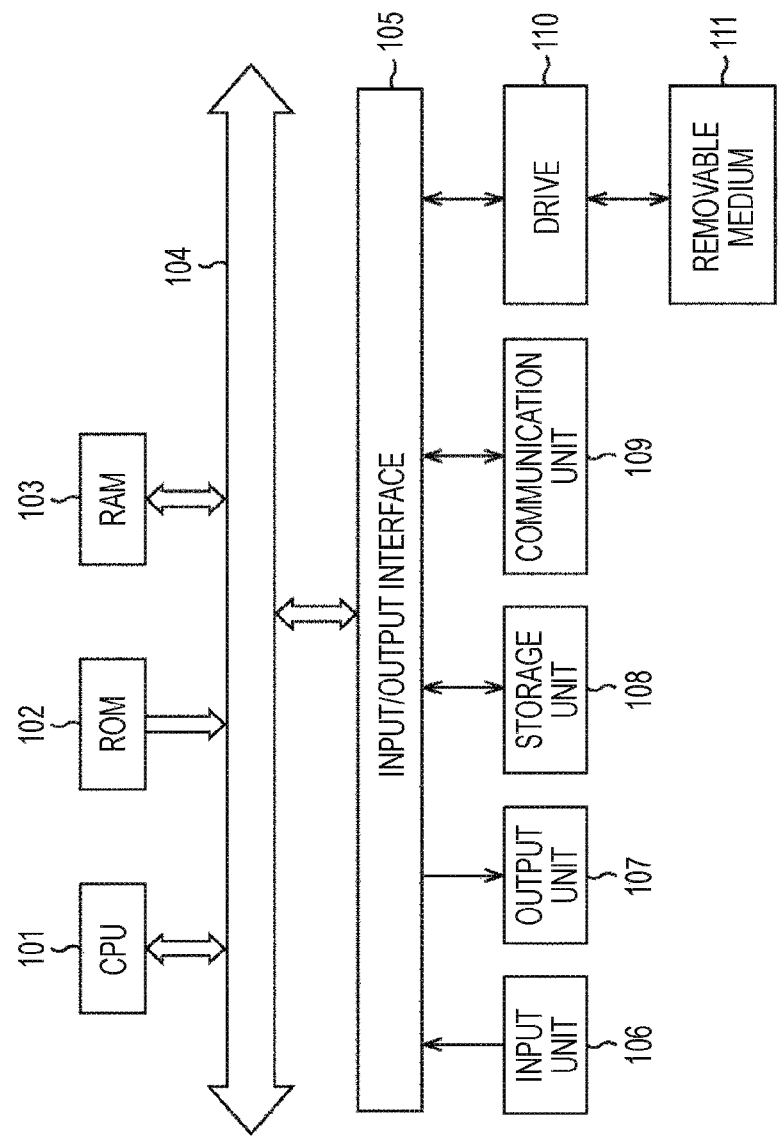
FIG. 15 is a block diagram of a configuration example of one embodiment of a computer to which the present technology has been applied.

FIG. 15 is a block diagram of a configuration example of the hardware of the computer configured to execute the above-described series of processing by the program.

In the computer, a central processing unit (CPU) 101, a read only memory (ROM) 102, and a random access memory (RAM) 103 are connected together via a bus 104.

The bus 104 is further connected to an input/output interface 105. The following units are connected to the input/output interface 105: an input unit 106 including a keyboard, a mouse, a microphone, etc.; an output unit 107 including a display, a speaker, etc.; a storage unit 108 including a hard disk, a non-volatile memory, etc.; a communication unit 109 including a network interface etc.; and a drive 110 configured to drive a removable medium 111 such as a magnetic disk, an optical disk, a magneto optical disk, or a semiconductor memory.

In the computer configured as described above, the CPU 101 loads and executes a program in the RAM 103 via the input/output interface 105 and the bus 104, the program being stored in the storage unit 108, for example. In this manner, the above-described series of processing is performed.

The program executed by the computer (the CPU 101) is stored in the removable medium 111 as a package medium including, e.g., a magnetic disk (including a flexible disk), an optical disk (e.g., a compact disc-read only memory (CD-ROM) or a digital versatile disc (DVD)), a magneto optical disk, or a semiconductor memory, or is provided via a wired or wireless transmission medium such as a local area network, the Internet, or digital satellite broadcasting.

Moreover, the removable medium 111 is attached to the drive 110 so that the program can be installed in the storage unit 108 via the input/output interface 105. Alternatively, the program can be received by the communication unit 109 via the wired or wireless transmission medium, and then, can be installed in the storage unit 108. As another alternative, the program can be installed in advance in the ROM 102 or the storage unit 108.

Figure 16:
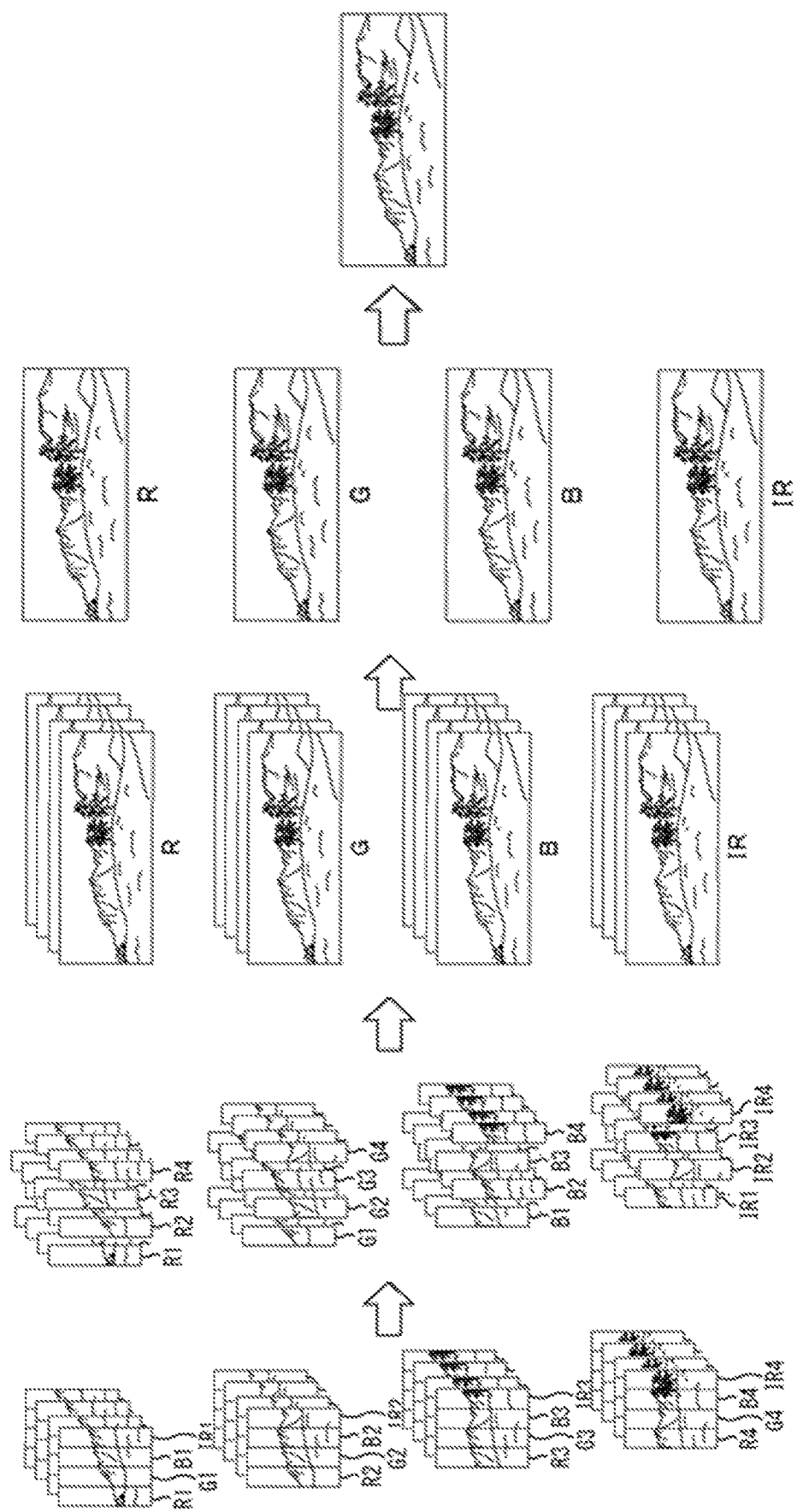
FIG. 16 is another view for describing processing of producing an output image having a wide range.

FIG. 16 is another view for describing processing of producing an output image having a wide range.

For example, pluralities of images (each plurality having four image sets of four images for a total of sixteen images in the example of FIG. 16) computed from image data that is captured in a time series, the image data being acquired by the detection device 12, are illustrated in descending order at a left end of FIG. 16. For example, as the vegetation inspection device is moved relative to the object to be inspected, the detection device 12 can sequentially capture a plurality of image data.

Each of the image sets captured at a particular exposure includes information for different polarization angles for each of the wavelength strips. For example, a first exposure is performed to capture part of an object to be inspected, as the vegetation inspection device 11 is moved along the moving direction of FIG. 2. According to FIG. 16, a first image set has four images, shown as stacked images on the top left end of FIG. 16, represent the image data captured at the first exposure. The four images of the first image set corresponds to four polarization angles of 0°, 45°, 90°, and 135° and is computed by the signal processing device 12, based on the image data acquired from the first exposure. As the vegetation inspection device 11 is moved along the moving direction of FIG. 2, a second exposure is performed to capture another part of the object to be inspected. A second image set with four other images stacked one over the other, shown below the first image set and slightly shifted to the right in FIG. 16 represent the image data captured at the second exposure. The four images of the second image set corresponds to four polarization angles of 0°, 45°, 90°, and 135° and is computed by the signal processing device 12, based on the image data acquired from the second exposure. Similarly, the vegetation inspection device 12 is further moved along the moving direction and third and fourth image sets, each with four images, are shown in the left end of FIG. 16.

Then, the signal processing device 13 divides the image data supplied from the detection device 12 into pluralities of divided images based on the wavelength band and the polarization angle. The stitching processing unit 24 sequentially stitches each plurality of the pluralities of divided images in the same wavelength band together. For example, based on the red wavelength band and the polarization angle of zero degrees, a red divided image R1 is divided from the first image set of the first plurality of images, a red divided image R2 is divided from the first image set of the second plurality of images, a red divided image R3 is divided from the first image set of the third plurality of images, and a red divided image R4 is divided from the first image set of the fourth plurality of images, are sequentially stitched by the stitching processing unit 24. Similarly, the stitching processing unit 24 stitches red divided images divided from the second image sets (polarization angle of forty-five degrees), the third image sets (polarization angle of ninety degrees), and the fourth image sets (polarization angle of one-hundred and thirty-five degrees) of the pluralities of images. Note that, the stitching processing unit 24 stitches divided images with the same polarization angle in the other wavelength bands, for each wavelength band.

Accordingly, the signal processing device 13 can acquire a plurality of output red images R (polarization angles of 0, 45, 90, and 135) including the red divided images stitched with a wide range and high resolution, a plurality of output green images G (polarization angles of 0, 45, 90, and 135) including the green divided images stitched with a wide range and high resolution, a plurality of output blue images B (polarization angles of 0, 45, 90, and 135) including the blue divided images stitched with a wide range and high resolution, and a plurality of output near-infrared images IR (polarization angles of 0, 45, 90, and 135) including the near-infrared divided images stitched with a wide range and high resolution.

The signal processing device 13 may use the plurality of output red images R (polarization angles of 0, 45, 90, and 135) and a polarization fitting process to generate a single output red image at any polarization angle. The signal processing device 13 may use the plurality of output green images G (polarization angles of 0, 45, 90, and 135) and the polarization fitting process to generate a single output green image at any polarization angle. The signal processing device 13 may use the plurality of output blue images B (polarization angles of 0, 45, 90, and 135) and the polarization fitting process to generate a single output blue image at any polarization angle. The signal processing device 13 may use the plurality of output near-infrared images IR (polarization angles of 0, 45, 90, and 135) and the polarization fitting process to generate a single output near-infrared image at any polarization angle.

Alternatively, the signal processing device 13 may select one of the plurality of output red images R (polarization angles of 0, 45, 90, and 135) as a single output red image at a pre-determined polarization angle (for example, 0, 45, 90, or 135). The signal processing device 13 may select one of the plurality of output green images G (polarization angles of 0, 45, 90, and 135) as a single output green image at a pre-determined polarization angle (for example, 0, 45, 90, or 135). The signal processing device 13 may select one of the plurality of output blue images B (polarization angles of 0, 45, 90, and 135) as a single output blue image at a pre-determined polarization angle (for example, 0, 45, 90, or 135). The signal processing device 13 may select one of the plurality of output near-infrared images IR (polarization angles of 0, 45, 90, and 135) as a single output near-infrared image at a pre-determined polarization angle (for example, 0, 45, 90, or 135).

Then, for example, the signal processing device 13 may output image data included in the single output red image, the single output green image, the single output blue image, and the single output near-infrared image, as output image data in an integrated format (color image data+near-infrared image data), as illustrated at a right end of FIG. 16. In this manner, the vegetation inspection device 11 has the configuration, and can acquire an output image having a wide range and high resolution for each predetermined wavelength band at any polarization angle.

Figure 17:
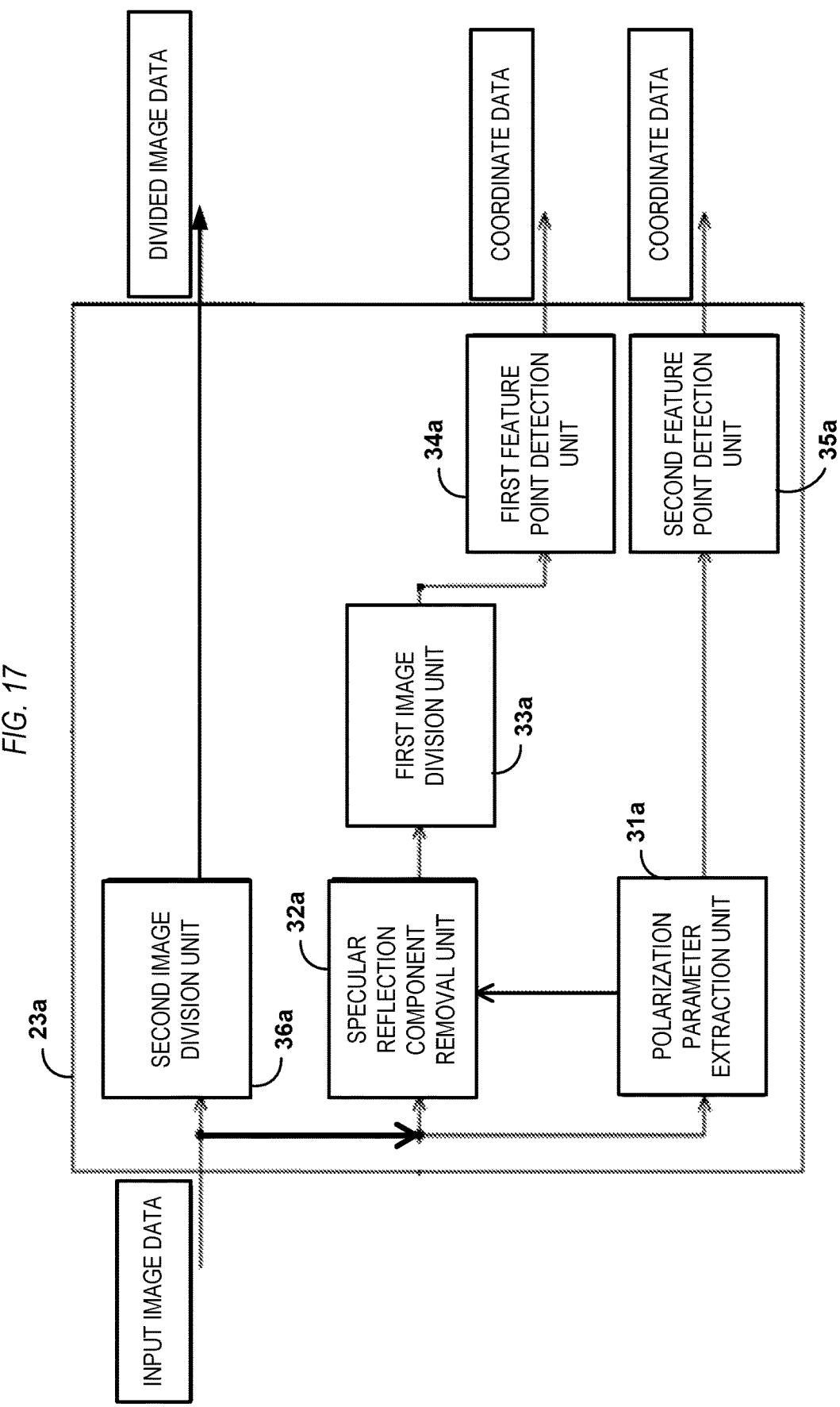
FIG. 17 is a block diagram of another exemplary configuration of a first image processing unit.

Next, FIG. 17 is a block diagram of another exemplary configuration of the first image processing unit 23a of FIG. 1.

As illustrated in FIG. 17, the first image processing unit 23a includes a polarization parameter extraction unit 31a, a specular reflection component removing unit 32a, a first image division unit 33a, a first feature point detection unit 34a, a second feature point detection unit 35a, and a second image division unit 36a.

The polarization parameter extraction unit 31a extracts a polarization parameter indicating a polarization state of light on the surface of the object to be inspected, so as to supply the polarization parameter to the specular reflection component removing unit 32a and the second feature point detection unit 35a, on the basis of the input image data supplied from the detection device 12. For example, the polarization parameter includes a polarization level indicating the degree of polarization when the light reflects from the surface of the object to be inspected and a normal vector indicating the angle of a normal of the surface of the object to be inspected with respect to the detection device 12. As described above with reference to FIG. 2, the detection device 12 detects the light in a polarization direction every 45° with four pixels adjacent to each other. Therefore, the polarization parameter extraction unit 31a can extract the polarization parameter on the surface of the object to be inspected, detected through the four pixels, on the basis of polarization information acquired from the pixel values of the four pixels (the difference between the pixel values in response to the different polarization directions of the respective pixels).

The specular reflection component removing unit 32a removes a specular reflection component being a component including the light specularly reflecting from the surface of the object to be inspected, from the input image data supplied from the detection device 12, on the basis of the polarization parameter supplied from the polarization parameter extraction unit 31a. For example, the light reflecting from the surface of the object to be inspected typically includes a polarized specular reflection component and a non-polarized diffuse reflection component.

Therefore, the specular reflection component removing unit 32a can remove the specular reflection component, for example, with a method of independent component analysis (ICA), on the basis of an assumption that the diffuse reflection component and the specular reflection component are statistically independent. Then, the specular reflection component removing unit 32a acquires an image excluding the influence of the specular reflection component from an image acquired by the detection device 12, so as to supply image data thereof to the first image division unit 33a.

The first image division unit 33a divides the image data supplied from the specular reflection component removing unit 32a, in accordance with the detection areas of the wavelength bands detected by the detection device 12, so as to supply divided image data for each wavelength band to the first feature point detection unit 34a.

The first feature point detection unit 34a detects a feature point indicating a distinctive point of a subject captured in the image based on the divided image data from the first image division unit 33a, so as to supply coordinate data indicating the coordinates of the feature point, to the stitching processing unit 24. For example, an edge of a point having a large variation in brightness or in color on the image, can be used as the feature point. In an alternative embodiment, the first feature point detection unit 34a may detect a feature point indicating a distinctive point of a subject captured in the image based on the divided image data from the second image division unit 36a instead of the first image division unit 33a, so as to supply coordinate data indicating the coordinates of the feature point, to the stitching processing unit 24.

The second feature point detection unit 35a detects a feature point indicating a distinctive point of a subject captured in the image including the polarization parameter supplied from the polarization parameter extraction unit 31a, mapped, so as to supply coordinate data indicating the coordinates of the feature point to the stitching processing unit 24.

The second image division unit 36a divides the input image data supplied from the detection device 12, in accordance with the polarization angle associated with each pixel of the detection device 12, so as to supply divided image data for each polarization angle to the stitching processing unit 24 (FIG. 1).

In this manner, the first image processing unit 23a has the configuration, and can supply the divided image data based on polarization angles of the pixels of the detection device 12, and the divided image data includes the specular reflection component to the stitching processing unit 24. In this manner, the first image processing unit 23 has the configuration, and can supply the coordinate data indicating the coordinates of the feature point acquired from the divided image data that includes the specular reflection component removed and has been divided for each wavelength band, and the coordinate data indicating the coordinates of the feature point on the image acquired on the basis of the polarization parameter, to the stitching processing unit 24.

Note that, the stitching processing unit 24 may use one or both of the coordinate data from the first feature point detection unit 34a and the second feature point detection unit 35a. In addition, note that, the polarization angle of the divided image data to be stitched by the stitching processing unit 24 may be specified by a user or selected by the stitching processing unit 24 based on a result of image analysis. For example, the specular reflection component determined by the specular reflection component removal unit 32a may be used by the stitching processing unit 24 to select a polarization angle with the lowest reflection component. As described above, the stitching processing unit 24 may use the divided image data (for example, color image data+near-infrared image data) with a polarization fitting process to generate a single output image at any polarization angle.

Figure 18:
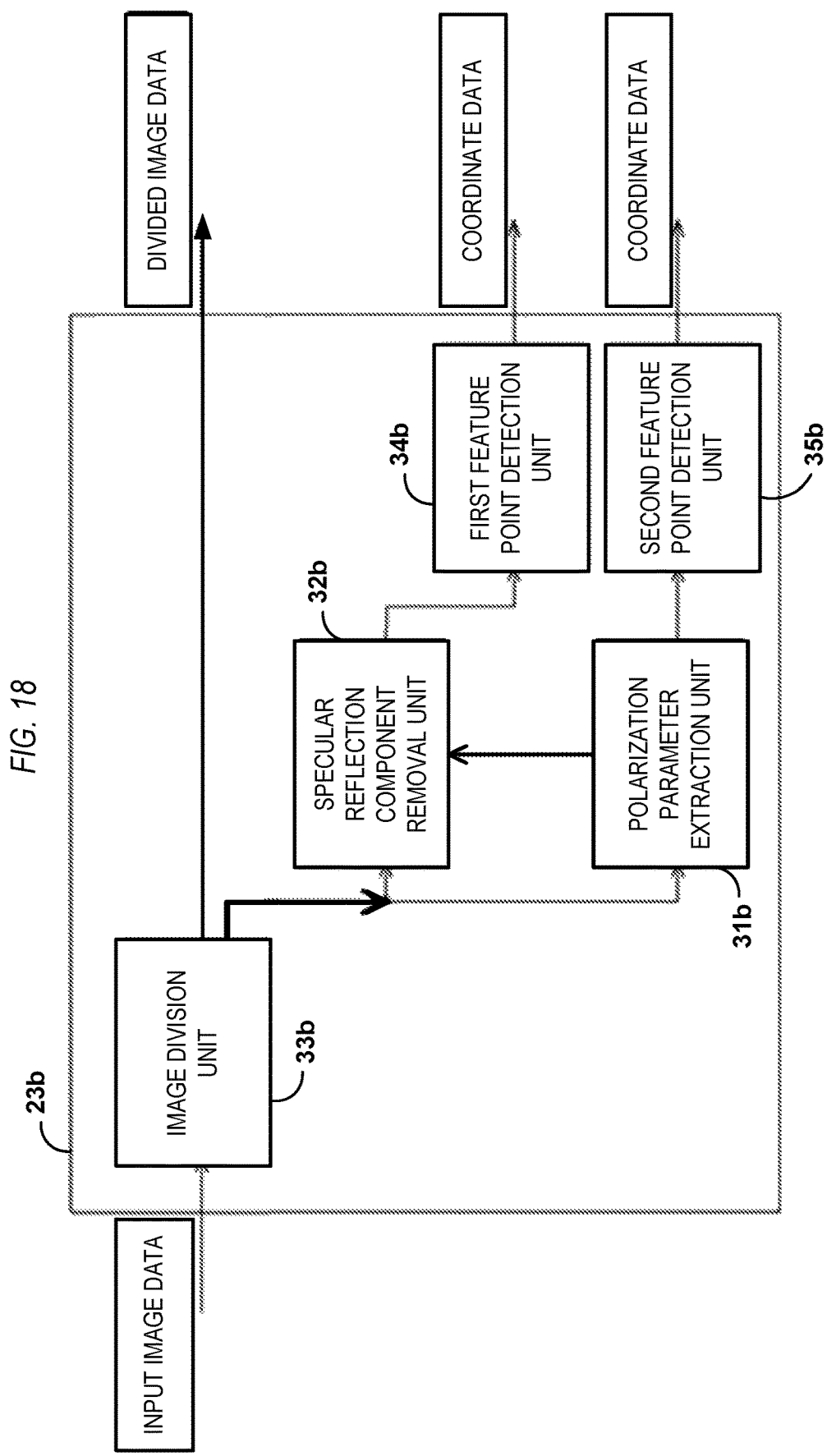
FIG. 18 is a block diagram of another exemplary configuration of a second image processing unit.

Next, FIG. 18 is a block diagram of another exemplary configuration of the second image processing unit 23b of FIG. 1.

As illustrated in FIG. 18, the second image processing unit 23b includes a polarization parameter extraction unit 31b, a specular reflection component removing unit 32b, an image division unit 33b, a first feature point detection unit 34b, and a second feature point detection unit 35b, similarly to the first image processing unit 23a of FIG. 17. Note that, the second image processing unit 23b has the sequence of performing the processing, different from that of the first image processing unit 23a of FIG. 17.

As illustrated in FIG. 18, the detection device 12 supplies the input image data to the image division unit 33b. The image division unit 33b divides the input image data supplied from the detection device 12, in accordance with the polarization angle associated with each pixel of the detection device 12, so as to supply divided image data for each polarization angle to the stitching processing unit 24 (FIG. 1). The image division unit 33b further divides the divided image data corresponding to each of the polarized angles, in accordance with the detection areas of the wavelength bands in the detection device 12, in the second image processing unit 23b. Then, the image division unit 33b supplies divided image data for each wavelength band, to the polarization parameter extraction unit 31b and the specular reflection component removing unit 32b. Therefore, the polarization parameter extraction unit 31b extracts a polarization parameter from the divided image data divided for each wavelength band, and the specular reflection component removing unit 32b removes a specular reflection component from the divided image data divided for each wavelength band, in the second image processing unit 23b. After that, the first feature point detection unit 34b and the second feature point detection unit 35b each extract a feature point similar to those described above, so as to supply coordinate data indicating the feature point to the stitching processing unit 24.

The second image processing unit 23b having the configuration in this manner, can supply the divided image data based on polarization angles of the pixels of the detection device 12, and the divided image data includes the specular reflection component to the stitching processing unit 24. The second image processing unit 23b can also supply the coordinate data indicating the coordinates of the feature point acquired from a divided image for each wavelength band, and the coordinate data indicating the coordinates of the feature point on the image acquired on the basis of the polarization parameter, to the stitching processing unit 24.

Note that, the stitching processing unit 24 may use one or both of the coordinate data from the first feature point detection unit 34b and the second feature point detection unit 35b. In addition, note that, the polarization angle of the divided image data to be stitched by the stitching processing unit 24 may be specified by a user or selected by the stitching processing unit 24 based on a result of image analysis. For example, the specular reflection component determined by the specular reflection component removal unit 32b may be used by the stitching processing unit 24 to select a polarization angle with the lowest reflection component. As described above, the stitching processing unit 24 may use the divided image data (for example, color image data+near-infrared image data) with a polarization fitting process to generate a single output image at any polarization angle.

Figure 19:
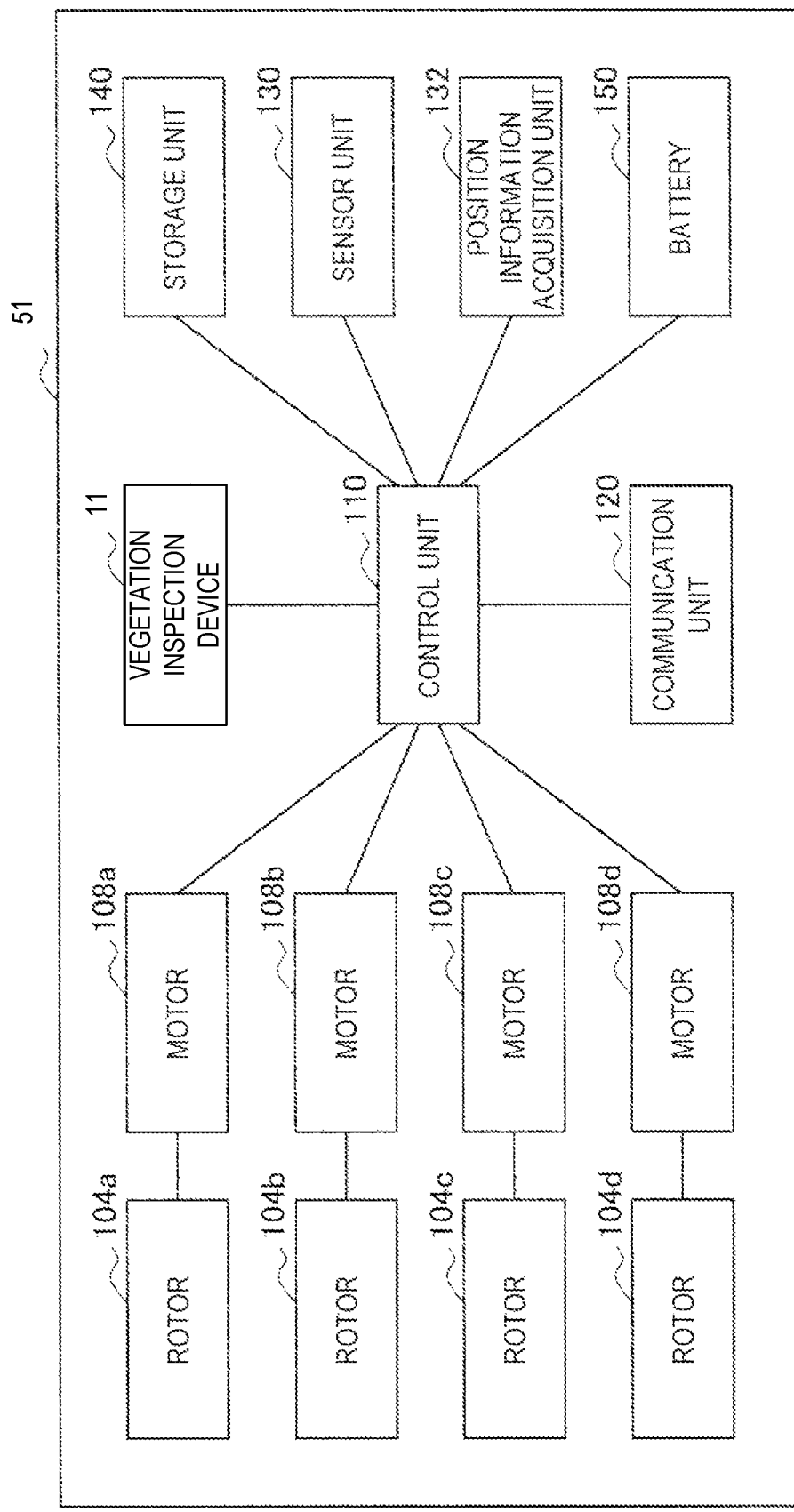
FIG. 19 is a block diagram of an exemplary embodiment of an unmanned aerial vehicle.

FIG. 19 is a block diagram of an exemplary embodiment of the unmanned aerial vehicle 51 of FIGS. 13 and 14.

As illustrated in FIG. 19, the unmanned aerial vehicle 51 according to an embodiment of the present disclosure is configured to include a vegetation inspection device 11, rotors 104a to 104d, motors 108a to 108d, a control unit 110, a communication unit 120, a sensor unit 130, a position information acquisition unit 132, a storage unit 140, and a battery 150.

The control unit 110 controls an operation of the unmanned aerial vehicle 51. For example, the control unit 110 can control an adjustment of the rotational speed of the rotors 104a to 104d by an adjustment of the rotational speed of the motors 108a to 108d, the imaging process by the vegetation inspection device 11, the transmission and reception processes of information to/from other devices (for example, a control terminal) through the communication unit 120, and storage and reading of information in and from the storage unit 140.

In the present embodiment, the control unit 110 controls a flight in which the rotational speed of the motors 108a to 108d is adjusted and execution of the imaging process of the still image by the imaging device 101 based on the flight information transmitted from the control terminal 200. The control unit 110 controls the motors 108a to 108d or the vegetation inspection device 11 based on the flight information transmitted from the control terminal. While the unmanned aerial vehicle is moving across a crop field or a farm road as illustrated in FIG. 14, the control unit 110 can control the detection device 12 to consecutively capture one or more images, and provide the one or more images to the control terminal based on a request of the control terminal. Further, the control unit 110 can control the stitching processing unit 24 to stitch the captured images to provide an output image to the control terminal based on another request of the control terminal.

The rotors 104a to 104d cause the unmanned aerial vehicle 51 to fly by generating a lift force from rotation thereof. Rotation of the rotors 104a to 104d is caused by rotation of the motors 108a to 108d. The motors 108a to 108d cause the rotors 104a to 104d to rotate. The rotation of the motors 108a to 108d can be controlled by the control unit 110.

The communication unit 120 performs transmission and reception processes of information to/from the control terminal through wireless communication. The unmanned aerial vehicle 51 transmits image data captured by the vegetation inspection device 11 from the communication unit 120 to the control terminal. In some examples, the image data is one or more divided images. In other examples, the image data is one image, for example, a raw polarized image of one wavelength band. In yet other examples, the image data is an output image (a stitched image). In addition, the unmanned aerial vehicle 51 receives instructions relating to flight from the control terminal using the communication unit 120.

The sensor unit 130 is a group of devices that acquire a state of the unmanned aerial vehicle 51, and may include, for example, an acceleration sensor, a gyro sensor, an ultrasonic sensor, a pneumatic sensor, an optical flow sensor, a laser range finder, or other suitable sensor. The sensor unit 130 can convert an acquired state of the unmanned aerial vehicle 51 into a predetermined signal, and provide the signal to the control unit 110 when necessary.

The position information acquisition unit 132 acquires information of a current position of the unmanned aerial vehicle 51 using, for example, the GPS, a vision sensor, or other suitable positioning unit. The position information acquisition unit 132 can provide the acquired information of the current position of the unmanned aerial vehicle 51 to the control unit 110 when necessary.

The control unit 110 executes control of the flight of the unmanned aerial vehicle 51 based on the flight information received from the control terminal using the information of the current position of the unmanned aerial vehicle 51 acquired by the position information acquisition unit 132.

The sensor unit 130 detects an obstacle that may interfere with a flight at the time of the flight. As the sensor unit 130 detects an obstacle, the unmanned aerial vehicle 51 can provide information related to the detected obstacle to the control terminal.

The storage unit 140 stores a variety of information. Examples of the information stored in the storage unit 140 include the flight information of the unmanned aerial vehicle 51 transmitted from the control terminal, and image data from the vegetation inspection device 11. In some examples, the image data is one or more divided images. In other examples, the image data is one image, for example, a raw polarized image of one wavelength band. In yet other examples, the image data is an output image (a stitched image).

The battery 150 accumulates electric power for operating the unmanned aerial vehicle 51. The battery 150 may be a primary battery in which only discharging is possible or may be a secondary battery in which charging is also possible, but when the battery 150 is the secondary battery, for example, the battery 150 can be supplied with electric power from a charging station.

The unmanned aerial vehicle 51 according to an embodiment of the present disclosure may have the configuration illustrated in FIG. 19 and thus can perform an automatic flight based on the flight path included in the flight information transmitted from the control terminal and execute the imaging processes described herein.

The exemplary function configuration of the unmanned aerial vehicle 51 according to an embodiment of the present disclosure has been described above with reference to FIGS. 13 and 14.

Note that, the present technology may have several different applications other than as a vegetation inspection device. Indeed, the present technology is applicable to wide imaging ranges that require scanning and stitching of images. For example, one application of the present technology is factory automation when the object of interest requires more than one scan, and in particular, more than one robotic scan. Another application of the present technology is a microscope image analysis of mineral salts. Another application of the present technology is a measurement of stress strain (photo elasticity). Another application of the present technology is a fault detection of a transparent resin molded product. Another application of the present technology is detection of contaminants in glass. Yet another application of the present technology is a measurement of film thickness.

Note that, the present technology can have the following configurations.

(1)

An imaging sensor comprising:
  a plurality of wavelength detection regions, the plurality of wavelength detection regions including at least a first wavelength detection region,
    wherein the first wavelength detection region comprises a plurality of pixels configured to
    detect light within a first pre-determined wavelength range, and
    detect the light at different pre-determined polarization directions.

(2)

The imaging sensor according to (1), wherein the plurality of wavelength detection regions further includes a second wavelength detection region, the second wavelength detection region comprises a second plurality of pixels configured to
  detect the light within a second pre-determined wavelength range, and
  detect the light at different pre-determined polarization directions,
the second pre-determined wavelength range is different than the first pre-determined wavelength range.

(3)

The imaging sensor according to (2), wherein
the first wavelength detection region and the second wavelength detection region are adjacent to each other.

(4)

The imaging sensor according to (1), wherein the plurality of pixels includes groups of pixels, each pixel of one of the groups of pixels is configured to detect the light at a pre-determined polarization direction, the groups of pixels are arranged to repeat within the first wavelength detection region.

(5)

The imaging sensor according to (1), wherein each wavelength detection region of the plurality of wavelength detection regions is formed in a rectangular shape elongated along a first direction, and
  when viewed in a second direction perpendicular to the first direction, the each wavelength detection region of the plurality of wavelength detection regions is arranged at one or more points.

(6)
　The imaging sensor according to (5), wherein the second direction is a direction of movement relative to an examination target.
(7)
　The imaging sensor according to (1), wherein each wavelength detection region of the plurality of wavelength detection regions is arranged at one or more points when viewed in a row direction and a column direction.
(8)
　The imaging sensor according to (1), wherein each wavelength detection region of the plurality of wavelength detection regions includes an array of at least sixteen pixels, the array of at least sixteen pixels including at least four row pixels and at least four column pixels.
(9)
　The imaging sensor according to (8), wherein the array of at least sixteen pixels is configured to detect the light in at least three or more polarization directions.
(10)
　The imaging sensor according to (1), wherein a first one of the plurality of wavelength detection regions is configured to detect the light within a red wavelength range, a second one of the plurality of wavelength detection regions is configured to detect the light within a green wavelength range, a third one of the plurality of wavelength detection regions is configured to detect the light within a blue wavelength range, and a fourth one of the plurality of wavelength detection regions is configured to detect the light with a near-infrared wavelength range.
(11)
　The imaging sensor according to (10), further comprising:
　a detection region configured to detect non-polarized light in all wavelength ranges.
(12)
　The imaging sensor according to (10), further comprising:
　　a detection region comprising a second plurality of pixels, a first pixel of the second plurality of pixels is configured to detect a non-polarized light within the red wavelength range, a second pixel of the plurality of pixels is configured to detect the non-polarized light within the green wavelength range, and a third pixel of the plurality of pixels is configured to detect the non-polarized light within the blue wavelength range,
　　the plurality of pixels is arranged in a Bayer array.
(13)
　The imaging sensor according to (1), wherein four of the plurality of pixels are configured to detect the light in one of four different polarization directions, the four of the plurality of pixels are arranged as a single set, and the single set is disposed in a matrix of four rows×four columns.
(14)
　The imaging sensor according to (1), further comprising:
　signal processing circuitry,
　wherein each wavelength region of the plurality of wavelength detection regions includes a different plurality of pixels,
　wherein the signal processing circuitry is configured to generate an image acquired for a wider area on a basis of a detection value detected by each pixel of the plurality of wavelength regions.
(15)
　An imaging method, the method comprising:
　detecting, with an imaging sensor, incident light; and
　outputting, with the imaging sensor, a plurality of image signals based on different polarizations of the incident light,
　wherein a first one or more image signals of the plurality of image signals are indicative of the different polarizations of the incident light in a first pre-determined wavelength range,
　wherein a second one or more image signals of the plurality of image signals are indicative of the different polarizations of the incident light in a second pre-determined wavelength range,
　wherein the first pre-determined wavelength range and the second pre-determined wavelength range are different from each other.
(16)
　The imaging method according to (15),
　wherein the first one or more image signals are from a first wavelength detection region, and
　wherein the second one or more image signals are from a second wavelength detection region.
(17)
　The imaging method according to (16), wherein
　the first wavelength detection region and the second wavelength detection region are adjacent to each other.
(18)
　The imaging method according to (15), further comprising:
　outputting, with the imaging sensor, a third one or more image signals of the plurality of image signals based on non-polarized light.
(19)
　The imaging method according to (15), further comprising:
　generating, with signal processing circuitry, an image acquired for a wider area on a basis of the plurality of image signals.
(20)
　A non-transitory computer-readable medium storing a program that, when executed by electronic processor, causes the electronic processor to perform a set of operations comprising:
　receiving a plurality of image signals from an image sensor,
　　wherein a first one or more image signals of the plurality of image signals are indicative of different polarizations of incident light in a first pre-determined wavelength range,
　　wherein a second one or more image signals of the plurality of image signals are indicative of the different polarizations of the incident light in a second pre-determined wavelength range,
　　wherein the first pre-determined wavelength range and the second pre-determined wavelength range are different from each other; and
　processing the plurality of image signals to generate an image that is based on a combination of the plurality of image signals.

Furthermore, the present technology can also have the following configurations.

(1)
　An examination device including:
　for each of wavelength ranges, a plurality of detection regions, each including a plurality of sensor elements arranged in a matrix and configured to detect light with an identical wavelength range,
　in which the plurality of sensor elements are arranged such that adjacent ones of the sensor elements detect light in different polarization directions and are arranged as a set including sensor elements corresponding to the number of polarization directions.

(2)

The examination device according to (1), in which each detection region is formed in a rectangular shape elongated along a first direction, and
when viewed in a second direction perpendicular to the first direction, the detection regions for all of the detectable wavelength ranges are each arranged at at least one or more points.

(3)

The examination device according to (2), in which the second direction is a moving direction of movement relative to an examination target as an object targeted for examination.

(4)

The examination device according to any of (1) to (3), in which the detection regions for all of the detectable wavelength ranges are each arranged at at least one or more points when viewed in a row direction and a column direction.

(5)

The examination device according to any of (1) to (4), in which each detection region including at least 16 sensor elements having four pixels in a row direction and four pixels in a column direction is a minimum detection region for each wavelength range.

(6)

The examination device according to any of (1) to (5), in which the sensor elements detect light in at least three or more polarization directions.

(7)

The examination device according to any of (1) to (6), in which the detection regions include a detection region configured to detect light with a red wavelength range, a detection region configured to detect light with a green wavelength range, a detection region configured to detect light with a blue wavelength range, and a detection region configured to detect light with a near-infrared wavelength range.

(8)

The examination device according to any of (1) to (7), further including:
a detection region configured to detect non-polarized light with all wavelength ranges.

(9)

The examination device according to any of (1) to (7), further including:
a detection region configured such that a sensor element configured to detect non-polarized light with the red wavelength range, a sensor element configured to detect non-polarized light with the green wavelength range, and a sensor element configured to detect non-polarized light with the blue wavelength range are arranged in a Bayer array.

(10)

The examination device according to any of (1) to (9), in which four of the sensor elements configured to detect light in four polarization directions are arranged as a single set, and the set is disposed in a matrix of four rows×four columns.

(11)

The examination device according to any of (1) to (10), further including:
a signal processing unit configured to perform, on a basis of a detection value detected by each sensor element, a signal processing of generating an image acquired for a wider area than that detectable each time.

(12)

An examination method by an examination device configured to include, for each of wavelength ranges, a plurality of detection regions, each having a plurality of sensor elements arranged in a matrix and configured to detect light with an identical wavelength range, and configured such that the plurality of sensor elements are arranged such that adjacent ones of the sensor elements detect light in different polarization directions and are arranged as a set including sensor elements corresponding to the number of polarization directions, including: performing, on a basis of a detection value detected by each sensor element, a signal processing of generating an image acquired for a wider area than that detectable each time.

(13)

A program executable by an examination device configured to include, for each of wavelength ranges, a plurality of detection regions, each having a plurality of sensor elements arranged in a matrix and configured to detect light with an identical wavelength range, and configured such that the plurality of sensor elements are arranged such that adjacent ones of the sensor elements detect light in different polarization directions and are arranged as a set including sensor elements corresponding to the number of polarization directions, wherein the program causes a computer to execute processing including performing, on a basis of a detection value detected by each sensor element, a signal processing of generating an image acquired for a wider area than that detectable each time.

(14)

A signal processing device including:
a feature point detection unit configured to detect, on the basis of output of a detection unit having, for each of wavelength ranges, a plurality of detection regions, each including a plurality of sensor elements configured such that adjacent ones of the sensor elements detect light in different polarization directions with an identical wavelength range, a feature point from an image acquired for each detection region; and
an image processing unit configured to stitch the image for each detection region on the basis of the detected feature point, thereby generating an image larger than a single image acquirable by the detection unit.

(15)

The signal processing device according to (14), further including:
a polarization parameter extraction unit configured to extract a polarization parameter indicating a light polarization state on a surface of an examination target as an object targeted for examination; and
a specular reflection component removing unit configured to remove, on the basis of the polarization parameter, a specular reflection component on the surface of the examination target from the image.

(16)

The signal processing device according to (15), in which adjacent ones of the sensor elements are arranged as a set including sensor elements corresponding to the number of polarization directions, and
the polarization parameter extraction unit extracts the polarization parameter on the basis of a sensor element output difference corresponding to a difference in the polarization direction among the sensor elements of each set.

(17)

The signal processing device according to (15) or (16), further including:

a polarization parameter feature point detection unit configured to detect a feature point from an image on which the polarization parameter extracted by the polarization parameter extraction unit is mapped, in which the image processing unit stitches the image for each detection region on the basis of the feature point detected by the polarization parameter feature point detection unit.

(18)

The signal processing device according to any one of (15) to (17), further including:

a division unit configured to divide the image according to the detection regions.

(19)

The signal processing device according to (18), in which division according to the detection regions by the division unit is performed after the polarization parameter has been extracted by the polarization parameter extraction unit.

(20)

The signal processing device according to (18), in which extraction of the polarization parameter by the polarization parameter extraction unit is performed after the image has been divided according to the detection regions by the division unit.

(21)

The signal processing device according to (18), further including:

an analysis unit configured to analyze the image; and a processing selection unit configured to select, according to an analysis result obtained by the analysis unit, either one of the first processing of performing division according to the detection regions by the division unit after the polarization parameter has been extracted by the polarization parameter extraction unit or the second processing of performing extraction of the polarization parameter by the polarization parameter extraction unit after the image has been divided according to the detection regions by the division unit.

(22)

The signal processing device according to (21), in which the analysis unit obtains histogram of pixel values for a single acquirable image, and obtains, for each detection region, the number of pixel values smaller than a particular reference value as an analysis result, and the processing selection unit selects the first processing when the number of pixel values smaller than the particular reference value is equal to or greater than a threshold in all of the detection regions, and selects the second processing when the number of pixel values smaller than the particular reference value is less than the threshold in any of the detection regions.

(23)

The signal processing device according to (21) or (22), in which the image is divided by the division unit in the first processing, the specular reflection component being removed from the image by the specular reflection component removing unit on the basis of the polarization parameter extracted by the polarization parameter extraction unit.

(24)

The signal processing device according to (21) or (22), in which removal of the specular reflection component by the specular reflection component removing unit is, in the second processing, performed for each image divided by the division unit on the basis of the polarization parameter extracted by the polarization parameter extraction unit from the image divided by the division unit.

(25)

A signal processing method including:

detecting, on the basis of output of a detection unit having, for each of wavelength ranges, a plurality of detection regions, each including a plurality of sensor elements configured such that adjacent ones of the sensor elements detect light in different polarization directions with an identical wavelength range, a feature point from an image acquired for each detection region; and stitching the image for each detection region on the basis of the detected feature point, thereby generating an image larger than a single image acquirable by the detection unit.

(26)

A program causing a computer to execute signal processing including detecting, on the basis of output of a detection unit having, for each of wavelength ranges, a plurality of detection regions, each including a plurality of sensor elements configured such that adjacent ones of the sensor elements detect light in different polarization directions with an identical wavelength range, a feature point from an image acquired for each detection region, and stitching the image for each detection region on the basis of the detected feature point, thereby generating an image larger than a single image acquirable by the detection unit.

Note that, the present embodiment is not limited to the above embodiments, and thus various alterations may be made without departing from the spirit of the present disclosure.

REFERENCE SIGNS LIST

11 Vegetation inspection device
12 Detection device
13 Signal processing device
21 Image data analysis unit
22 Image processing selection unit
23a First image processing unit
23b Second image processing unit
24 Stitching processing unit
31a and 31b Polarization parameter extraction unit
32a and 32b Specular reflection component removing unit
33a and 33b Image division unit
34a and 34b First feature point detection unit
35a and 35b Second feature point detection unit
36a Second image division unit
51 Unmanned aerial vehicle
104a, 104b, 104c, and 104d Rotor
108a, 108b, 108c, and 108d Motor
110 Control unit
120 Communication unit
130 Sensor unit
132 Position information acquisition unit
140 Storage unit
150 Battery

The invention claimed is:

1. An imaging sensor comprising:
a plurality of wavelength detection regions, the plurality of wavelength detection regions including a first wavelength detection region, a second wavelength detection region that is directly adjacent to the first wavelength detection region, a third wavelength detection region that is directly adjacent to the second wavelength detection region and is not directly adjacent to the first wavelength detection region, and fourth wavelength detection region that is directly adjacent to the third wavelength detection region and is not directly adjacent to the first wavelength detection region and the second wavelength detection region, wherein the first wavelength detection region comprises a plurality of pixels configured to
detect light within a first pre-determined wavelength range, and
detect the light at different pre-determined polarization directions, and
wherein the first pre-determined wavelength range is a near-infrared wavelength range,
wherein the second wavelength detection region comprises a second plurality of pixels configured to
detect the light within a second pre-determined wavelength range, and
detect the light within the second pre-determined wavelength range at the different pre-determined polarization directions,
the second pre-determined wavelength range is different than the first pre-determined wavelength range,
wherein the third wavelength detection region comprises a third plurality of pixels configured to
detect the light within a third pre-determined wavelength range, and
detect the light within the third pre-determined wavelength range at the different pre-determined polarization direction,
the third pre-determined wavelength range is different than the first pre-determined wavelength range and the second pre-determine wavelength range, and
wherein the fourth wavelength detection region comprises a fourth plurality of pixels configured to
detect the light within a fourth pre-determine wavelength range, and
detect the light within the fourth pre-determined wavelength range at the different pre-determined polarization directions,
the fourth pre-determined wavelength range is different than the first pre-determined wavelength range, the second pre-determined wavelength range, and the third pre-determined wavelength range.

2. The imaging sensor according to claim 1, wherein the plurality of pixels includes groups of pixels, each pixel of one of the groups of pixels is configured to detect the light at a pre-determined polarization direction, the groups of pixels are arranged to repeat within the first wavelength detection region.

3. The imaging sensor according to claim 1, wherein each wavelength detection region of the plurality of wavelength detection regions is formed in a rectangular shape elongated along a first direction, and
when viewed in a second direction perpendicular to the first direction, the each wavelength detection region of the plurality of wavelength detection regions is arranged at one or more points.

4. The imaging sensor according to claim 3, wherein the second direction is a direction of movement relative to an examination target.

5. The imaging sensor according to claim 1, wherein each wavelength detection region of the plurality of wavelength detection regions is arranged at one or more points when viewed in a row direction and a column direction.

6. The imaging sensor according to claim 1, wherein each wavelength detection region of the plurality of wavelength detection regions includes an array of at least sixteen pixels, the array of at least sixteen pixels including at least four row pixels and at least four column pixels.

7. The imaging sensor according to claim 6, wherein the array of at least sixteen pixels is configured to detect the light in at least three or more polarization directions.

8. The imaging sensor according to claim 1, wherein the second wavelength detection region of the plurality of wavelength detection regions is configured to detect the light within a blue wavelength range, the third wavelength detection region of the plurality of wavelength detection regions is configured to detect the light within a green wavelength range, and the fourth wavelength detection region of the plurality of wavelength detection regions is configured to detect the light within a red wavelength range.

9. The imaging sensor according to claim 8, further comprising:
a detection region configured to detect non-polarized light in all wavelength ranges.

10. The imaging sensor according to claim 8, further comprising:
a detection region comprising a fifth plurality of pixels, a first pixel of the fifth plurality of pixels is configured to detect a non-polarized light within the red wavelength range, a second pixel of the fifth plurality of pixels is configured to detect the non-polarized light within the green wavelength range, and a third pixel of the fifth plurality of pixels is configured to detect the non-polarized light within the blue wavelength range,
the fifth plurality of pixels is arranged in a Bayer array.

11. The imaging sensor according to claim 1, wherein four of the plurality of pixels are configured to detect the light in one of four different polarization directions, the four of the plurality of pixels are arranged as a single set, and the single set is disposed in a matrix of four rows×four columns.

12. The imaging sensor according to claim 1, further comprising:
signal processing circuitry,
wherein each wavelength region of the plurality of wavelength detection regions includes a different plurality of pixels,
wherein the signal processing circuitry is configured to generate an image acquired for a wider area on a basis of a detection value detected by each pixel of the plurality of wavelength detection regions.

13. The imaging sensor according to claim 2, wherein the groups of pixels are arranged to repeat within the first wavelength detection region, the second wavelength detection region, the third wavelength detection region, and the fourth wavelength detection region.

14. The imaging sensor according to claim 1, wherein the second wavelength detection region is directly adjacent to the first wavelength detection region in a first direction, wherein the third wavelength detection region is directly adjacent to the second wavelength detection region in the first direction, wherein the fourth wavelength detection region is directly adjacent to the third wavelength detection region in the first direction, and wherein the first direction is a direction that is opposite to a direction of movement relative to an examination target.

15. An imaging method, the method comprising:
detecting, with an imaging sensor, incident light;
outputting, with the imaging sensor, a first one or more image signals from a first wavelength detection region, the first one or more image signals are indicative of different polarizations of the incident light in a first pre-determined wavelength range;

outputting, with the imaging sensor, a second one or more image signals from a second wavelength detection region that is directly adjacent to the first wavelength detection region, the second one or more image signals are indicative of the different polarizations of the incident light in a second pre-determined wavelength range;

outputting, with the imaging sensor, a third one or more image signals from a third wavelength detection region that is directly adjacent to the second wavelength detection region and is not directly adjacent to the first wavelength detection region, the third one or more image signals are indicative of the different polarizations of the incident light in a third pre-determined wavelength range; and outputting, with the imaging sensor, a fourth one or more image signals from a fourth wavelength detection region that is directly adjacent to the third wavelength detection region and is not directly adjacent to the first wavelength detection region and the second wavelength detection region, the fourth one or more image signals are indicative of the different polarizations of the incident light in a fourth pre-determined wavelength range, wherein the first pre-determined wavelength range, the second pre-determined wavelength range, the third pre-determined wavelength range, and the fourth pre-determined wavelength range are different from each other, wherein the first pre-determined wavelength range is a near-infrared wavelength range.

16. The imaging method according to claim 15, further comprising:
outputting, with the imaging sensor, a fifth or more image signals from a fifth wavelength detection region, the fifth one or more image signals based on non-polarized light.

17. The imaging method according to claim 15, further comprising:
generating, with signal processing circuitry, an image acquired for a wider area on a basis of the first one or more image signals, the second one or more image signals, the third one or more image signals, and the fourth one or more image signals.

18. The imaging method according to claim 15, wherein the second wavelength detection region is directly adjacent to the first wavelength detection region in a first direction, wherein the third wavelength detection region is directly adjacent to the second wavelength detection region in the first direction, wherein the fourth wavelength detection region is directly adjacent to the third wavelength detection region in the first direction, and wherein the first direction is a direction that is opposite to a direction of movement relative to an examination target.

19. A non-transitory computer-readable medium storing a program that, when executed by electronic processor, causes the electronic processor to perform a set of operations comprising:
receiving a first one or more image signals from a first wavelength detection region of an imaging sensor, the first one or more image signals are indicative of different polarizations of incident light in a first pre-determined wavelength range, receiving a second one or more image signals from a second wavelength detection region of the imaging sensor, the second wavelength detection region is directly adjacent to the first wavelength detection region, and the second one or more image signals are indicative of the different polarizations of the incident light in a second pre-determined wavelength range;

receiving a third one or more image signals from a third wavelength detection region of the imaging sensor, the third wavelength detection region is directly adjacent to the second wavelength detection region and is not directly adjacent to the first wavelength detection region, and the third one or more image signals are indicative of the different polarizations of the incident light in a third pre-determined wavelength range;

receiving a fourth one or more image signals from a fourth wavelength detection region of the imaging sensor, the fourth wavelength detection region is directly adjacent to the third wavelength detection region and is not directly adjacent to the first wavelength detection region and the second wavelength detection region, and the fourth one or more image signals are indicative of the different polarizations of the incident light in a fourth pre-determined wavelength range; and an image that is based on a combination of the first one or more image signal, the second one or more image signals, the third one or more image signals, and the fourth one or more image signals.

20. The non-transitory computer-readable medium according to claim 19, wherein the second wavelength detection region is directly adjacent to the first wavelength detection region in a first direction, wherein the third wavelength detection region is directly adjacent to the second wavelength detection region in the first direction, wherein the fourth wavelength detection region is directly adjacent to the third wavelength detection region in the first direction, and wherein the first direction is a direction that is opposite to a direction of movement relative to an examination target.

* * * * *